(12) United States Patent
Henschel et al.

(10) Patent No.: US 12,397,261 B2
(45) Date of Patent: Aug. 26, 2025

(54) METHOD FOR ELECTROCHEMICAL HYDROGEN SEPARATION FROM NATURAL-GAS PIPELINES

(71) Applicant: BASF SE, Ludwigshafen am Rhein (DE)

(72) Inventors: Carsten Henschel, Ludwigshafen am Rhein (DE); Otto Machhammer, Ludwigshafen am Rhein (DE); Andreas Fuessl, Ludwigshafen am Rhein (DE)

(73) Assignee: BASF CATALYSTS GERMANY GMBH, Hannover (DE)

( * ) Notice: Subject to any disclaimer, the term of this patent is extended or adjusted under 35 U.S.C. 154(b) by 397 days.

(21) Appl. No.: 17/914,371

(22) PCT Filed: Mar. 26, 2021

(86) PCT No.: PCT/EP2021/058010
§ 371 (c)(1),
(2) Date: Sep. 26, 2022

(87) PCT Pub. No.: WO2021/198102
PCT Pub. Date: Oct. 7, 2021

(65) Prior Publication Data
US 2023/0111285 A1    Apr. 13, 2023

(30) Foreign Application Priority Data

Mar. 30, 2020   (EP) ..................................... 20166598

(51) Int. Cl.
*B01D 53/22*   (2006.01)
*B01D 53/32*   (2006.01)
*C01B 3/50*    (2006.01)

(52) U.S. Cl.
CPC ......... *B01D 53/228* (2013.01); *B01D 53/326* (2013.01); *C01B 3/501* (2013.01); *B01D 2256/16* (2013.01); *B01D 2257/7025* (2013.01)

(58) Field of Classification Search
None
See application file for complete search history.

(56) References Cited

U.S. PATENT DOCUMENTS

2004/0112427 A1   6/2004   Klassen
2011/0200897 A1   8/2011   McAlister
(Continued)

FOREIGN PATENT DOCUMENTS

EP   0907400 A1   4/1999
EP   2477725 B1   1/2014
(Continued)

OTHER PUBLICATIONS

English language machine translation for WO 2019/180032 A1. Retrieved from translationportal.epo.org on Dec. 23, 2024. (Year: 2024).*

(Continued)

*Primary Examiner* — Jason M Greene
(74) *Attorney, Agent, or Firm* — Faegre Drinker Biddle & Reath LLP

(57) ABSTRACT

The present invention comprises a one-stage membrane process for electrochemical separation of hydrogen from natural gas streams in a pipeline (1) having a positive pressure in the range from 50 mbar to 100 bar, having the following process steps:

(i) a gas substream (2) is drawn off from the natural gas stream in a pipeline (1) without any change in the gas composition, where the mass flow rate of the gas substream is adjusted depending on the hydrogen con- (Continued)

tent in the natural gas stream (1) such that a depletion level of 0.65 to 0.975 is established in the case of a hydrogen concentration of <10% by volume and a depletion level of 0.55 to 0.925 in the case of a hydrogen concentration of >10% by weight, where the depletion level is defined as the quotient of the desired molar H2 product stream (6) and the molar H2 reactant flow rate in the gas substream at the inlet of the membrane unit (2), (ii) this gas substream (2) is compressed (3) upstream of a membrane unit (5), (iii) this gas substream is heated to 100 to 250° C. either upstream of the membrane unit or in the membrane unit, and this gas substream is supplied with water (4) upstream of the membrane unit and/or on the permeate side of the membrane unit (4a), such that the water loading is between 0.005 and 0.2 mol of water/mol of natural gas, (iv) this gas substream is sent to an electrochemical membrane unit in which hydrogen is separated off as permeate (6a) at a temperature of 100 to 250° C., (v) the retentate (8) from the membrane unit is recycled into the natural gas stream, sent to a chemical utilization and/or used as fuel.

The present invention further comprises a method of ascertaining the optimized gas substream which is drawn off from a pipeline that conducts natural gas and hydrogen in order to separate hydrogen from this gas substream in an electrochemical membrane unit.

12 Claims, 9 Drawing Sheets

(56) References Cited

U.S. PATENT DOCUMENTS

| | | |
|---|---|---|
| 2012/0272824 A1 | 11/2012 | Menzel |
| 2014/0030615 A1 | 1/2014 | Pollica et al. |
| 2017/0204525 A1* | 7/2017 | Mutoro ............... B01D 53/326 |

FOREIGN PATENT DOCUMENTS

| | | |
|---|---|---|
| EP | 2979743 B1 | 10/2019 |
| JP | 2008-248934 A | 10/2008 |
| WO | 97/46304 A1 | 12/1997 |
| WO | 2010/115768 A1 | 10/2010 |
| WO | 2010/115786 A1 | 10/2010 |
| WO | 2016/050500 A1 | 4/2016 |
| WO | WO 2019180032 A1 * | 9/2019 ............ B01D 53/22 |

OTHER PUBLICATIONS

Search Report received for EP Application No. 20166598.1, mailed on Jan. 18, 2021, 3 pages (Original Document Only).

Search Report received for EP Application No. 20166598.1, mailed on Mar. 24, 2021, 3 pages (Original Document Only).

International Search Report and Written Opinion received for PCT Patent Application No. PCT/EP2021/058010, mailed on Jun. 24, 2021, 17 pages (2 pages of English Translation and 15 pages of Original Document).

* cited by examiner

METHOD FOR ELECTROCHEMICAL HYDROGEN SEPARATION FROM NATURAL-GAS PIPELINES

CROSS-REFERENCE TO RELATED APPLICATIONS

This application is a national stage application (under 35 U.S.C. § 371) of PCT/EP2021/058010, filed Mar. 26, 2021, which claims benefit of European Application No. 20166598.1, filed Mar. 30, 2020, both of which are incorporated herein by reference in their entirety.

DESCRIPTION

The present invention comprises a one-stage membrane process for electrochemical separation of hydrogen from natural gas streams in a pipeline (1) having a positive pressure in the range from 50 mbar to 100 bar, having the following process steps:
- (i) a gas substream (2) is drawn off from the natural gas stream in a pipeline (1) without any change in the gas composition, where the mass flow rate of the gas substream is adjusted depending on the hydrogen content in the natural gas stream (1) such that a depletion level of 0.65 to 0.975 is established in the case of a hydrogen concentration of <10% by volume and a depletion level of 0.55 to 0.925 in the case of a hydrogen concentration of >10% by weight, where the depletion level is defined as the quotient of the desired molar H2 product stream (6) and the molar H2 reactant flow rate in the gas substream at the inlet of the membrane unit (2),
- (ii) this gas substream (2) is compressed (3) upstream of a membrane unit (5),
- (iii) this gas substream is heated to 100 to 250° C. either upstream of the membrane unit or in the membrane unit, and this gas substream is supplied with water (4) upstream of the membrane unit and/or on the permeate side of the membrane unit, such that the water loading is between 0.005 and 0.2 mol of water/mol of natural gas,
- (iv) this gas substream is sent to an electrochemical membrane unit in which hydrogen is separated off as permeate (6a) at a temperature of 100 to 250° C.,
- (v) the retentate (8) from the membrane unit is recycled into the natural gas stream, sent to a chemical utilization and/or used as fuel.

The present invention further comprises a method of ascertaining the optimized gas substream which is drawn off from a pipeline that conducts natural gas and hydrogen in order to separate hydrogen from this gas substream in an electrochemical membrane unit.

Hydrogen:

Hydrogen offers the desired prerequisites to become a key factor for the energy supply of the future. The transport sector in particular is faced with the major challenge of becoming more climate-friendly. In Germany, transport is responsible for almost 20 percent of total CO2 emissions, with a good half of this coming from private transport.

The introduction of electromobility, which includes battery-electric and fuel-cell-electric vehicles, allows the transport sector to reduce its dependence on petroleum-based fuels. In the best case, the power or hydrogen required for the operation of the vehicles is produced from renewable energy sources. In the transport sector, hydrogen is a new fuel that produces no local pollutants when used with fuel-cell technology.

In order to be able to use hydrogen in fuel-cell applications, it has to be in a very high quality, since impurities have effects on catalysts and membranes.

Hydrogen is currently produced predominantly centrally in comparatively large steam-methane reformer (SMR) production units. The hydrogen is subsequently compressed to a high level (up to 500 bar), and in rare cases is also liquefied in order to bring it by means of corresponding transport vehicles to the site where it is required, for example at a hydrogen filling station.

Other H2 production processes are, for example, electrolysis, pyrolysis, partial oxidation of hydrocarbons (POx), coal gasification processes and biogas production processes.

However, transport of hydrogen by vehicle is uneconomic and detrimental to the environment. For example, the transport of about 1 t of high-pressure hydrogen would require a truck for a transport load of 40 t. Large hydrogen filling stations use about 1 t of hydrogen per day. In other words, every filling station of any great size would have to be supplied by a large truck every day. For an extensively developed hydrogen filling station network, this would mean that truck traffic on the roads, which is very dense already, would perceptibly increase further.

In parallel to vehicle transport, pure hydrogen pipelines already exist nowadays in fragmented form. But in order to be able to supply filling stations with hydrogen over a large area, it would be necessary to create a dedicated dense hydrogen pipeline grid analogously to the natural gas grid. Consideration is being given to hydrogen pipeline grids in which the hydrogen could be transported at different pressure levels. However, such pipeline grids have very high infrastructure costs and also require complex approval procedures, which is why realization in the near future seems somewhat unlikely.

Consideration is also being given to the production of hydrogen in a decentralized manner in smaller production units, for example by electrolysis, pyrolysis or SMR, thereby shortening the transport route or eliminating it altogether. But these decentralized small plants have very high specific capital expenditure costs compared to central large-scale plants and are superior in terms of cost to the combination of a central large-scale plant and vehicle transport only when the transport routes are very long (for example greater than a few hundred kilometers).

Since the natural gas grid in many countries has already been developed to a very dense network, it would be highly economically and environmentally advantageous to be able to utilize this additionally for transport of hydrogen as well.

According to the DVGW study "Anforderungen, Möglichkeiten und Grenzen der Abtrennung von Wasserstoff aus Wasserstoff/Erdgasgemischen [Demands, Options and Limits in the Separation of Hydrogen from Hydrogen/Natural Gas Mixtures](G 201611)", hydrogen as energy carrier can be transported in the existing network for natural gas supply. According to the results of the study, however, the addition of hydrogen to natural gas can lead to problems on the user side and can require the removal of hydrogen, for instance at natural gas filling stations, gas infrastructure installations or industrial plants. In order to protect the plants, membrane methods, for example palladium membranes, adsorption methods, cryogenic methods, and chemical conversion of the hydrogen to methane (methanation) or to water (oxidation) have been proposed.

H2-carrying gases in pipelines may in principle be any of those known to the person skilled in the art. Examples of these are: L gas, H gas, natural gas, city gas, town gas, biogas, but also, for example, CO2.

Typical natural gas compositions are:

| | |
|---|---|
| methane (CH4) | 80% to 90% by volume |
| ethane (C2H6) | 1% to 5% by volume |
| propane (C3H8) | 0.4% to 0.7% by volume |
| butane (C4H10) | 0.1% to 0.2% by volume |
| carbon dioxide (CO2) | 0% to 1% by volume |
| nitrogen (N2) | 0.8% to 14% by volume |
| mercaptans (odorization) | 3 mg/m$^3$ to 50 mg/m$^3$ % by volume |

There are no restrictions in principle with regard to the type of pipeline either. Examples of typical pipelines are long-distance transport pipelines with a positive pressure of 30 to 220 bar, high-pressure pipelines at 1 to 10 bar, medium-pressure pipelines at 100 mbar to 1 bar, low-pressure pipelines at 10 to 100 mbar.

However, if hydrogen is required in molecular form at the usage site (e.g. hydrogen filling station), the use of natural gas pipelines for transport of hydrogen is possible only through use of hydrogen-obtaining separation methods, since, in the case of methanation and oxidation, the hydrogen no longer exists as such at the site of use, but is present as methane or water.

Hydrogen-obtaining separation methods are membrane methods, sorption methods or distillation methods.

Distillative separation of hydrogen from natural gas is possible in principle on account of the large differences in boiling temperature. At ambient pressure, for example, hydrogen boils at −253° C. and methane at −161° C. For the selective separation of the two gases, however, the entire amount of natural gas has to be cooled down and liquefied. In order to obtain pure hydrogen, moreover, it is additionally also necessary to liquefy a major portion of the hydrogen. Distillative separation is thus very costly.

Sorption Methods May be Physical or Chemical in Nature:

Useful chemical sorption methods according to the prior art include metal hydride stores or liquid organic hydrogen carriers (LOHCs). In both cases, the hydrogen temporarily enters into a strong chemical bond to the metal hydride or to the LOHC (e.g. carbazole). The binding energy released here has to be expended again in the separation of the hydrogen from the metal hydride or from the LOHC. Since the binding energy released is always at a lower temperature level on sorption than the energy required for the desorption, the chemical sorption methods are always associated with losses, usually in the order of magnitude of >25% of the energy content of the hydrogen separated.

Useful physical sorption methods according to the prior art include both pressure swing adsorption (PSA) and temperature swing adsorption (TSA). These adsorption methods are economically viable particularly in the case of small amounts of substance to be separated. Using a swing adsorption, or gas components apart from hydrogen would be separated off and only the hydrogen would remain in the product gas stream. In other words, it would be necessary to absorb 90% or more of the natural gas-hydrogen mixture. In this concentration range, the physical adsorption methods are therefore extremely uneconomic.

The state of art in membrane technology for the separation of hydrogen from pipelines is pressure-driven passive methods.

Useful membranes for pressure-driven passive methods include materials through which hydrogen molecules (H2) can diffuse, but large gas molecules such as CH4 or CO2 for example cannot. By way of example, such a membrane consists of a thin palladium layer applied to a porous substrate layer. The palladium layer is responsible for the selectivity and the porous substrate layer for the mechanical strength of the membrane, which has to be very high owing to the large pressure differential across the membrane which is needed for the separation.

Pressure-driven passive membrane processes are suitable in principle for the separation of hydrogen from a hydrogen-natural gas mixture, but have serious disadvantages in the pipeline case, for two reasons:

1. The driving force for the separation here is a partial pressure differential: If, for example, the natural gas-hydrogen mixture in the pipeline is under a pressure of 20 bar and the hydrogen content in the natural gas is to be depleted to 1% by volume, the smallest partial hydrogen pressure in the pipeline would be 20 bar*0.01=0.2 bar. Since predominantly hydrogen is present on the permeate side, the partial hydrogen pressure there corresponds approximately to the total pressure. In other words, the hydrogen separated is obtained at a maximum of 0.2 bar. If the pressure were higher, hydrogen would be pushed back into the pipeline.

In order that the membrane areas, which are inversely proportional to the partial pressure differential, do not become too large and hence too costly, the hydrogen is obtained at far lower pressures in reality.

But since the use of hydrogen, for example for the filling of cars, requires very high pressures (>800 bar), the compression energy expenditure in this case is very high, especially since the compression, for example from 0.2 bar to 2 bar, requires nearly as much mechanical energy as that from 2 to 20 or from 20 to 200 bar. Moreover, the size and hence the costs of gas compressors are coupled to the volume flow rate. This is, for example, 10 times greater at 0.2 bar than 2 bar and 100 times greater than at 20 bar. The gas compressors are correspondingly costly at low inlet pressures.

2. Passive membrane processes have a selectivity of <100% selectivity. Because the separation effect is based solely on the difference in size of the molecules, not only H2 but also small amounts of CH4 diffuse, especially since the partial pressure differential for CH4 across the membrane is a number of orders of magnitude above that of H2 owing to the concentration ratios on either side of the membrane. Therefore, the hydrogen removed, without further purification steps, will not have the necessary purity of >99.97%, as required, for example, in ISO/TS 14687-2-2012 for PEM fuel cells.

Electrochemical hydrogen separation (EHS) is an electrochemical process based on the transport of protons (H+ ions) through ion-conducting membranes and is a novel use for fuel-cell technology (see WO 2016/50500 and WO 2010/115768). The water-containing mixture enters the anode chamber, where it is oxidized to protons and electrons. An electric power supply provides the driving force for transport of the protons through the catalyzed membranes, where they couple at the cathode to form "new" hydrogen (also referred to as "evolving" hydrogen at the electrode).

There is correspondence here between proton flow and electron flow. The voltage required for the proton flow and electron flow depends here both on the partial pressure differential and on the catalyst activity. The catalyst activity in turn depends on how little or much it is deactivated by trace gases, for example CO, CO2 or H2S.

Since the membranes transport only protons, the other constituents of the gas mixture remain in the offgas system. EHS is thus capable of producing hydrogen of high purity (>99.99% H2).

Electrochemical active methods such as EHS could be superior to the pressure-driven passive methods for this case of use. In relation to the EHS low-temperature methods that take place in the temperature region of <100° C., however, there are well-founded concerns owing to the sulfur-containing trace gases that are always present in the natural gas and CO, which can lead very rapidly to deactivation of the catalysts needed for the membrane process that are based predominantly on platinum.

The advantage of the electrochemically active EHS methods is that hydrogen can be transported against the partial pressure differential. Therefore, this technology is suitable both for depletion of the hydrogen in the natural gas grid down to well below 1% by volume of H2 and for working at a high operating pressure.

A good overview of the prior art for separation of H2 from natural gas grids is given by the summary of the HyGrid WP10 Exploitation Workshop [https://www.higrid-h2.eu/sites/hygrid.drupal.pulsartecnalia.com/files/documents/HYGRID-WP10-D1016-DLR-TUE-09072017-v01.pdf].

HyGrid describes, for example, a hybrid system of three different separation methods for separation of H2 from H2-containing natural gas pipelines. According to this, in the first step, a passive membrane method based on Pd membranes is to be used for the depletion from 10% to 2% H2 in the natural gas pipeline, followed by further depletion in the natural gas pipeline for the concentration range below 2% H2 with the aid of an EHS method. Rather than the abbreviation EHS, HyGrid uses the abbreviation EHP for the electrochemical separation of H2. In the specific case, a sulfonic acid-based Nafion membrane is used. Finally, the hydrogen resulting from the two separation methods is then to be dried in a TSA.

This approach has multiple disadvantages:
1. Three process stages are necessary.
2. At least hydrogen from the passive membrane process has to be compressed for further use for the reasons elucidated above.
3. The EHP used for this hybrid system works in the low-temperature range and is thus very prone to irreversible catalyst damage by catalyst poisons in the natural gas, for example CO or H2S. The technology is based on what are called low-temperature PEM membrane electrode assemblies that were developed for fuel cells, which are operated with pure hydrogen. The oxidation of the hydrogen and the reduction of the oxygen to water are based on platinum catalysts that are irreversibly deactivated even by very small amounts of CO etc.
4. Moreover, the EHP required for this hybrid system requires a high partial water vapour pressure, typically 100% relative humidity, in order to prevent the membrane from drying out and to obtain conductivity. The gas mixture must therefore be saturated with water before the separation, typically with a relative moisture content of 100%, and the hydrogen has to be demoisturized again after the separation.

If the intention is then to use the existing natural gas grid and infrastructure in accordance with the invention, the separation technology used must be matched to the structure and required limits, for example with regard to the permitted water content in the natural gas mixture. For example, it is required that the water dew point under ambient conditions is −8° C. or lower in order to prevent damage in the downstream pipeline system as a result of corrosion or through hydrate formation. For a pipeline pressure of 70 bar, for example, this means that the water content in the saturated state must not be higher than about 74 mg/m$^3$.

If technologies that require a high partial water vapour pressure are then used for the separation of H2, for example saturation state in the separation of H2, and this separation of H2 takes place at relatively high temperatures, for example at 20 to 160° C., it is then necessary to add water to the H2-containing natural gas mixture before the separation, which has to be separated again from natural gas mixture after the separation of H2.

The relevant technologies for drying of natural gas, i.e. the separation of water from natural gas, are known to the person skilled in the art. An overview of the prior art with regard to the methods of drying natural gas is given, for example, by EP 2 477 725 B1 or EP 0 907 400 A1.

A further important constraint in the utilization of existing natural gas pipelines is the prevailing pressures in the pipeline. In pipelines for long-distance transport, pressures may be up to 220 bar. This long-distance grid feeds multiple high-pressure grids with pressures between 4 and 16 bar. The predominant natural gas recipient at this pressure level is industry. The high-pressure grids in turn branch into medium-pressure networks with positive pressures of 0.1 to 1 bar. Predominantly commercial natural gas consumers are connected to these medium-pressure grids, but also industry and even some private users. The low-pressure network, at a lower pressure level, transports the natural gas predominantly to private users with low positive pressures between 22 and 100 mbar.

What this means for the separation method is that, according to the site of natural gas abstraction and separation technology, the pressure required for the separation of the hydrogen from the natural gas mixture has to be adjusted. Particularly for pressure-driven separation technology, this means that the pressure of the natural gas has to be significantly increased again, which can lead to a high level of energy expenditure.

Moreover, the natural gas mixture has to be moistened in accordance with the requirements of the individual separation technologies and then dried again, with the drying in particular being a costly process step.

Moreover, the natural gas mixture has to be brought to the corresponding temperature required for the separation. This is particularly true of palladium-based ceramic membranes that are operated at about 100° C., and of the phosphoric acid-based EHS membrane which is operated at temperatures up to 200° C.

It becomes clear that what is crucial for the economic viability of the separation of H2 from natural gas pipelines is not just the choice of the separation technology but also the natural gas pretreatment and the offgas after treatment prior to the reintroduction of the H2-depleted natural gas into the natural gas grid.

It is obvious to the person skilled in the art that it is technically difficult and economically problematic to pass the entire natural gas stream through a separation unit in order to separate just a small amount of H2 therefrom. In this case, it would be necessary to compress, heat up, moisten and dry the entire amount of natural gas again. Corresponding natural gas pretreatment and aftertreatment steps would be very costly.

The concept of partial gas abstraction is disclosed in the above-cited summary of the HyGrid WP10 Exploitation Workshop on page 5 of the HyGrid presentation. However, there is no mention either of the abovementioned natural gas pretreatment and aftertreatment steps, nor are any recommendations given with regard to the partial gas volume flow rate. Reference is merely made to the possible need to dry the H2 product stream for specific applications.

JP2008248934 describes partial gas abstraction without disclosing corresponding natural gas pretreatment and aftertreatment steps and does not give any recommendations with regard to the partial gas volume to be used.

EP 2 979 743B1 describes an apparatus and method for storage and distribution of renewable energy. The focus of the application lies in the intermediate storage of the hydrogen separated from the H2-carrying natural gas mixture, which can then be recycled into the natural gas mixture as required. There is no mention of natural gas pretreatment and aftertreatment steps apart from the need for a corresponding storage pressure, and recommendations with regard to the partial gas volume are given only to the extent that they enable the establishment of the desired H2 concentration in the natural gas pipeline.

WO 2019/180032 describes a process for separating hydrogen from gas mixtures with the aid of a combination of two membranes. The permeate from first membrane stage, a passive gas membrane, is moistened with water and passed into a second membrane stage, an electrochemical membrane. The permeate from this second membrane stage is dried and guided to the H2 consumer. The retentate from the second membrane stage is compressed and dried before being recycled into the natural gas conduit.

One disadvantage of this process is that two membrane stages are required. A further disadvantage of this two-stage process is that the pressure for the first membrane stage must be high. The separation of H2 in the first membrane stage is effected via a partial pressure differential. Given a target partial H2 pressure on the permeate side of at least 1 bar, this means that the pressure in the natural gas pipeline must, for example, be greater than 10 bar when the H2 concentration in the natural gas pipeline is 10% by volume and must, for example, be 20 bar when the H2 concentration in the natural gas pipeline is 5% by volume. However, the predominant number of natural gas pipelines have a pressure of less than 10 bar. In other words, in this case, a dedicated compressor for increasing the pressure has to be installed upstream of the first membrane stage. Moreover, in WO 2019/180032, the entire pipeline stream is guided through this first membrane stage. Consequently, the dimensions of this gas membrane have to be correspondingly large, and the non-negligible pressure drop has to be counterbalanced for the entire pipeline stream.

One challenge for the future lies (i) in the inexpensive decentralized provision of high-purity hydrogen, for example for the filling of hydrogen vehicles for the operation of fuel cells for decentralized supply with electrical power. Moreover, (ii) it is intended that it shall be possible to provide low-hydrogen natural gas inexpensively, for example for the glass industry, chemical utilization or storage in caverns.

It was thus an object of the present invention to indicate a process which, with the aid of just a single membrane stage, can separate hydrogen from a pipeline, especially from a pipeline at low positive pressure, and hence indicates inexpensive decentralized provision of high-purity hydrogen.

It was another object of the invention to indicate an optimized partial gas volume that is to be separated for pipeline, with which the lowest hydrogen separation costs arise with use of an EHS.

What is also being sought is a guideline as to what partial gas volume should be separated from the pipeline in order that the lowest separation costs arise in the separation of hydrogen with the aid of an EHS.

DETAILED DESCRIPTION

Figure 1:
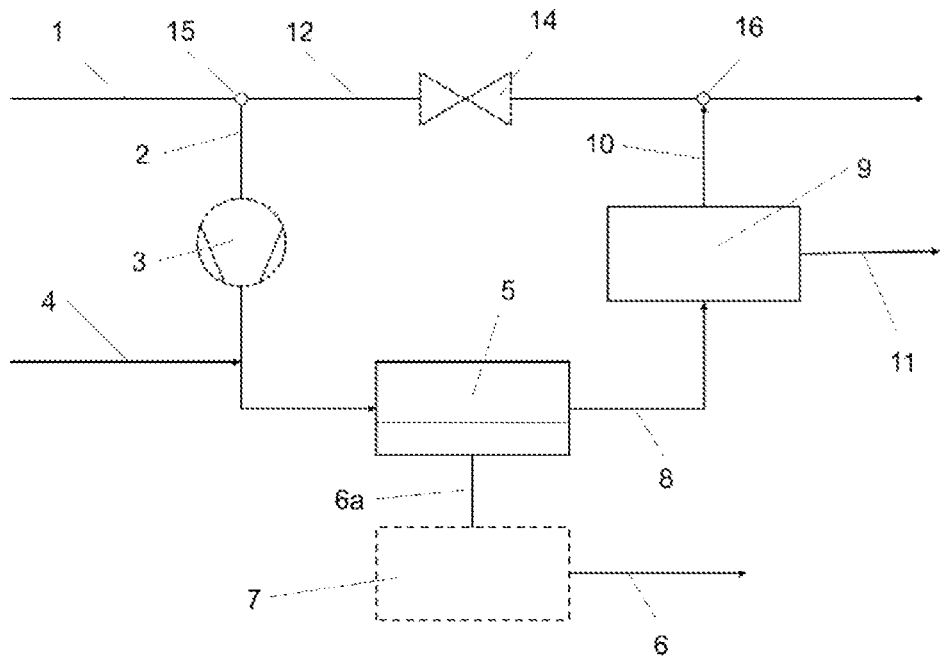
FIG. 1 shows the process according to the invention where the product is high-purity H2.

Surprisingly, a one-stage membrane process for electrochemical separation of hydrogen from natural gas streams in a pipeline (1) having a positive pressure in the range from 50 mbar to 100 bar has been found, which has the following process steps (FIG. 1):

(i) a gas substream (2) is drawn off from the natural gas stream in a pipeline (1) without any change in the gas composition, where the mass flow rate of the gas substream is adjusted depending on the hydrogen content in the natural gas stream (1) such that a depletion level of 0.65 to 0.975 is established in the case of a hydrogen concentration of <10% by volume and a depletion level of 0.55 to 0.925 in the case of a hydrogen concentration of >10% by weight, where the depletion level is defined as the quotient of the desired molar H2 product stream (6) and the molar H2 reactant flow rate in the gas substream at the inlet of the membrane unit (2), (ii) this gas substream (2) is compressed (3) upstream of a membrane unit (5), (iii) this gas substream is heated to 100 to 250° C. either upstream of the membrane unit or in the membrane unit, and this gas substream is supplied with water (4) upstream of the membrane unit and/or on the permeate side of the membrane unit (6a), such that the water loading is between 0.005 and 0.2 mol of water/mol of natural gas, (iv) this gas substream is sent to an electrochemical membrane unit in which hydrogen is separated off as permeate (6a) at a temperature of 100 to 250° C., (v) the retentate (8) from the membrane unit is recycled into the natural gas stream at the feed point (16), sent to a chemical utilization and/or used as fuel.

In the description that follows, all percentages are by volume, unless it is stated explicitly that they are by mass. In the gas phase, mol % corresponds to the percentage by volume.

Step (i):

From a hydrogen-containing natural gas stream being conveyed in a pipeline is taken, for example with the aid of one or more compressors, a gas substream of up to 80% by volume, preferably 0.0001% to 80% by volume, of the total natural gas stream, preferably up to 50% by volume, preferably 0.0001% to 50% by volume, further preferably up to 30% by volume, preferably 0.0001% to 30% by volume, further preferably of 20% by volume, preferably 0.0001% to 20% by volume, especially up to 15% by volume, preferably 0.01% to 15% by volume. The composition of the gas substream (2) corresponds to the composition of the natural gas mixture (1) in the pipeline, i.e. the gas substream (2) is taken without any change in the gas composition. The design of a tapping point for taking of natural gas substreams is known to the person skilled in the art. For instance, the tapping point for taking of a natural gas substream may advantageously be designed, for example, as follows: A volumeter measures the volume flow rate taken (2). An electronic device compares this volume with a target value. If the partial gas flow rate taken is below the target value, the compressor (3) is driven so as to convey a greater volume. If the partial gas flow rate taken is above the target value, the compressor (3) is driven so as to convey a smaller volume. The target value derives from the optimal depletion level AG which is described in detail below.

The positive pressure in the pipeline is advantageously 50 mbar to 100 bar, preferably 100 mbar to 20 bar, further preferably 100 mbar to 10 bar, further preferably 100 mbar to 5, further preferably 100 mbar to 4 bar, other preferably 100 mbar to 3 bar, preferably 100 mbar to 2 bar, especially 100 mbar to 1 bar. The pipeline is advantageously a low-pressure and medium-pressure pipeline.

Advantageously, the hydrogen-containing natural gas stream comprises 0.1% to 30% by volume of hydrogen, preferably 0.5% to 10% by volume of hydrogen, more preferably 0.5% to 5% by volume of hydrogen, further preferably 0.5% to 3% by volume of hydrogen, especially 1.0% to 2% by volume of hydrogen.

The energy expenditure for the separation of the hydrogen from the natural gas stream is determined by the hydrogen content in the natural gas mixture, and also by the necessary water moisture content for the EHS and by the pressure drop over the total distance between the draw point and the point at which the hydrogen-depleted gas substream is fed back to the pipeline. The interplay of these three influences is complex and would lead to incorrect conclusions without a meaningful index. Therefore, the index of depletion level AG is introduced, with the aid of which the lowest apparatus complexity and energy expenditure can be ascertained for any scenario. The optimal mass flow rate is then calculated from the optimal depletion level.

The depletion level AG is defined as the ratio of the molar H2 reactant mass flow rate present in the gas substream at the inlet of the membrane unit EHS, $n_{TG,H2}\alpha$, and the desired molar H2 product flow rate (6) $n_{H2,Pr}$ in the formula:

$$AG = n_{H2,Pr}/n_{TG,H2}\alpha$$

The person skilled in the art is able to use the specified depletion level to determine the preferred mass flow rate of the gas substream and to adjust it via the output of the compressor(s) in step (ii).

$$m_{TG,var},\alpha_{,opt} = (M_{PL}/M_{H2})*(1/AG_{var,opt})* (1+1/Y_{PL,H2},\alpha)m_{H2,Pr} \quad (1)$$

For the establishment of the optimized depletion level, preference is given to using two mass flow rate meters for measurement of the hydrogen content and of the mass flow rate, preferably in the gas substream (2) and in the permeate stream (6a).

When the hydrogen loading of the pipeline is <10% by volume, the optimized depletion level is advantageously 0.65 to 0.975, especially 0.85 to 0.975.

Preferably, in the case of a hydrogen loading of the pipeline of <5% by volume, an optimized depletion level of 0.75 to 0.975, further preferably 0.8 to 0.975, especially 0.85 to 0.975, is chosen.

Preferably, in the case of a hydrogen loading of the pipeline of 5% to <10% by volume, an optimized depletion level of 0.65 to 0.95, further preferably 0.8 to 0.95, especially 0.825 to 0.925, is chosen.

When the hydrogen loading of the pipeline is 10% to <20% by volume, the optimized depletion level is advantageously 0.55 to 0.925, further preferably 0.7 to 0.9, especially 0.75 to 0.9.

Preferably, in the case of a hydrogen loading of the pipeline of 10% to <15% by volume, an optimized depletion level of 0.6 to 0.925, further preferably 0.7 to 0.925, especially 0.8 to 0.9, is chosen.

Preferably, in the case of a hydrogen loading of the pipeline of 15% to >20% by volume, an optimized depletion level of 0.55 to 0.9, further preferably 0.7 to 0.9, especially 0.725 to 0.85, is chosen.

Step (ii):

This gas substream is compressed with an apparatus for increasing the pressure (e.g. fan or compressor) in order either to counterbalance the pressure drops with respect to the pipeline between the withdrawal and refeeding station along the gas substream pathway and/or to build up the necessary pressure for the H2 membrane separation, advantageously 50 mbar to 1 bar. The pressure drop between the withdrawal station and the refeeding station is typically 1 mbar to 5 bar, preferably 10 mbar to 2 bar, especially 50 mbar to 1 bar. This apparatus for increasing the pressure may in principle be positioned anywhere in the gas substream pathway between the withdrawal station and the refeeding station; the determination of the optimized position is known to the person skilled in the art. In the case of low pressure drops, advantageously in the range of 1 mbar to 10 mbar, the apparatus for increasing the pressure is advantageously positioned downstream of the membrane unit and upstream of the refeeding station in flow direction of the gas substream. In the case of high pressure drops, advantageously in the range of 1 bar to 5 bar, the apparatus for increasing the pressure is advantageously positioned between the withdrawal station and upstream of the membrane unit in flow direction of the gas substream.

In some cases, for example at the end of a pipeline run, it is advantageous to reduce the pressure of the pipeline stream (12), example with the aid of a throttle or a turbine.

Step (iii):

In step (iii), the gas substream is heated to 100 to 250° C., preferably to 100 to 200° C. Suitable apparatuses for heating the gas substream are known to the person skilled in the art; advantageously, a gas-gas heat exchanger is used. Preference is given to heating up the gas substream (2) prior to the addition of water. Particular preference is given to simultaneously heating up the gas substream (2) and cooling down the retentate (8) in a gas-gas heat exchanger. Preference is given to cooling down the retentate (8) before the drying process (9).

Preference is given to adding water to the gas substream for moistening of the gas substream. The manner in which the water is supplied is known to the person skilled in the art. The water content needed differs according to the membrane technology and is known to the person skilled in the art. In the case of EHS within a temperature range of advantageously 120 to 200° C., the preferred water loading is 0.005 to 0.2 mol of H2O/mol of natural gas, further preferably 0.005 to 0.1 mol of H2O/mol of natural gas, further preferably 0.01 to 0.05 mol of H2O/mol of natural gas, further preferably 0.015 to 0.035 mol of H2O/mol of natural gas, especially 0.02 to 0.03 mol of H2O/mol of natural gas. This addition of water can be effected upstream of the membrane unit and/or on the permeate side of the membrane unit; in the case of EHS, the cathode space is the permeate side. Preference is given to the addition of water upstream of the membrane unit.

Step (iv):

In the membrane unit, hydrogen is separated from the gas substream, i.e. hydrogen is formed as permeate. Depending on the membrane unit used, the permeate comprises too much water for the subsequent use. In this case, it is advantageous to conduct a drying process on the permeate (7), for example temperature swing adsorption (TSA), drying with adsorber materials such as silica gel, CaO, superabsorbents or by glycol scrubs. The operating conditions of the TSA are known to the person skilled in the art and are described, for example, in https://www.reicat.de/de/gas-trocknung.html.

Advantageous applications for the use of the hydrogen separated are hydrogen filling stations and decentralized hydrogen users. Moreover, this process offers the option of a hydrogen-free natural gas stream for processes that are sensitive to hydrogen, for example natural gas caverns, chemical processes, turbines.

Membrane Unit:

A preferred membrane unit is the EHS, which uses a phosphoric acid-doped membrane. The setup for hydrogen separation is largely identical to a fuel cell setup. The core of the EHS system is the membrane electrode assembly (MEA). On the anode side, hydrogen molecules are oxidized on a catalyst to protons, which pass through the proton-selective membrane to the cathode side, while electrons migrate through an external electrical circuit to the cathode. As long as current is being applied, the EHS system thus separates hydrogen from gas mixtures. The technology of electrochemical hydrogen separation is described for example in WO 2016/50500 and WO 2010/115786.

The catalytically active material used may be the customary compounds and elements known to those skilled in the art that catalyze the dissociation of molecular hydrogen into atomic hydrogen, the oxidation of hydrogen to protons, and the reduction of protons to hydrogen. Suitable examples are Pd, Pt, Cu, Ni, Ru, Fe, Co, Cr, Mn, V, W, tungsten carbide, Mo, molybdenum carbide, Zr, Rh, Ru, Ag, Ir, Au, Re, Y, Nb, and alloys and mixture thereof, with preference in accordance with the invention given to Pt. The catalytically active materials may also be present in supported form, preferably with carbon as support. In a further development of the membrane electrode assembly, the amount of the catalytically active material in the cathode catalyst is 0.1 mg/cm2 to 2.00 mg/cm2, preferably 0.1 mg/cm2 to 1 mg/cm2, based on the total surface area of the anode and cathode.

The membrane used in accordance with the invention selectively conducts protons, that is to say, in particular, that it is not electron-conducting. In accordance with the invention, it is possible to use for the membranes all materials known to those skilled in the art from which proton-conducting membranes can be formed. It is also possible to use in accordance with the invention selectively proton-conducting membranes such as are known from fuel-cell technology.

Materials that are particularly suitable for the production of gas-tight and selectively proton-conducting membranes are polymer membranes. Suitable polymers are sulfonated polyether ether ketones (S-PEEK), sulfonated polybenzimidazoles (S-PBI), and sulfonated fluorinated hydrocarbon polymers (for example Nafion®). It is also possible to use perforated polysulfonic acids, styrene-based polymers, poly (arylene ethers), polyimides, and polyphosphazenes.

Very particular preference is given to using membranes made of polybenzimidazoles, especially MEAs based on polybenzimidazole and phosphoric acid, such as those marketed under the Celtec-P® name by BASF SE.

The operating conditions of the EHS system are strongly dependent on the MEA chosen. When using the Celtec® technology, the use of a voltage of 0.1 to 0.4 V and a current of 0.2 to 1 A/cm$^2$ is advantageous. The separation of H2 is based not on differential pressure, but on electrochemistry. EHS can therefore be operated advantageously at ambient pressure. Provided there is no differential pressure between the anode and the cathode, a higher pressure is advantageous, which results in a higher separation rate.

The hydrogen separation rate is typically between 60% and 99%, preferably 70 to 95%, especially 80% to 90%, wherein the higher the separation rate, the higher the electrical energy requirement of an EHS.

The current density is advantageously 0.1 to 1 A/cm$^2$, preferably 0.2 to 0.7 A/cm$^2$, especially 0.2 to 0.5 A/cm$^2$. The voltage is advantageously 1 to 1000 mV, preferably 100 to 800 mV, especially 150 to 350 mV.

These electrochemical hydrogen separation systems are operated at temperatures of advantageously 120 to 200° C., preferably 150 to 180° C., especially 160 to 175° C. The pressure is advantageously 0.5 to 40 bar, preferably 1 to 10 bar, especially 1 to 5 bar. The pressure difference between the anode side and the cathode side is advantageously less than 1 bar, preferably less than 0.5 bar.

This mode of operation allows a high tolerance to gas impurities, for example CO (3%) and H2S (15 ppm), to be achieved.

This relatively low temperature permits relatively rapid and material-sparing start-up and shutdown, which is an advantage especially for non-continuous operation in decentralized systems with fluctuating hydrogen output, for example in filling stations.

The active surface area of the membrane electrode assembly is advantageously within a range from 5 to 20 000 cm$^2$, preferably 25 to 10 000 cm$^2$, especially 150 to 1000 cm$^2$.

The thickness of the membrane electrode assembly is advantageously within a range from 250 to 1500 μm, preferably 600 to 1000 μm.

At a construction volume of 1 m$^3$, a hydrogen separation stack consisting of end plates, bipolar plates, seals, and membrane electrode assemblies advantageously separates 100 to 200 Nm$^3$/h hydrogen and is accordingly significantly smaller than systems with physical hydrogen separation.

The energy consumption is typically between 3 and 7 kWh/kg H2, depending on the gas composition and chosen separation rate.

Since the electrochemical separation is based on gas-tight, highly selective proton-conducting membranes, the purity of the hydrogen generated can be very high, typically greater than around 99.9%, preferably greater than 99.95%, in particular greater than 99.99%.

Particular preference is given to the following membrane electrode assembly specifications:

| Specification | Width (mm) | Thickness (μm) | Acid concentration (wt %) | Acid content (mg/cm$^3$) | Acid content (mg/cm$^2$) | PBI content (mg/cm$^3$) | I.V. value (dL/g) |
|---|---|---|---|---|---|---|---|
| Values | 310 | 360-440 | 51-59 | 760-870 | 30-37 | 65-89 | 4.50-6.00 |

PBI = polybenzimidazole
I.V. = inherent viscosity

Depletion Level:

The depletion level AG is defined as the ratio of the molar H2 reactant mass flow rate present in the gas substream at the inlet of the membrane unit EHS, $n_{TG,H2}\alpha$, and the desired molar H2 product flow rate (6) $n_{H2,Pr}$ in the form:

$$AG = n_{H2,Pr}/n_{TG,H2}\alpha$$

The optimal depletion level with regard to costs is dependent on the required separation energy expenditure for the respective depletion.

The depletion level AG leads to the molar partial gas volume flow rate $n_{TG}$ which is drawn off from the pipeline for separation of the amount of H2 product, $n_{H2,Pr}$, according to the following formula:

$$n_{TG} = (1/AG)*(1+1/Y_{PL,H2,\alpha})*n_{H2,Pr}$$

The loading $Y_{PL,H2,\alpha}$ is proportional to the H2 concentration in the natural gas pipeline and is defined as the molar loading of the natural gas $n_{PL,EG}$ with hydrogen $n_{PL,H2}$ before the withdrawal of the gas substream $n_{TG}$.

$$Y_{PL,H2,\alpha} = n_{PL,H2}/n_{PL,EG}$$

The depletion level is advantageously in the range between 0.5 and 0.999, preferably 0.7 and 0.99, further preferably between 0.80 and 0.99.

The term "loading" is known to the person skilled in the art, inter alia, from the description of the composition of moist air (see https://www.thm.de/wi/images/user/Thielen-72/Downloads/Energietechnik/Kapitel_8_-_feuchte_Luft.pdf, pages 146 and 147). In the case of moist gases, the composition is typically based on the mass or moles of the dry gas, since these parameters of the dry gas remain constant in all physical processes.

The loading $Y_{PL,H2,\alpha}$ can be converted to % by volume for a two-substance mixture consisting of H2 and CH4 by the following formula:

$$y_{PL,H2,\alpha} \text{ in \% by volume} = n_{PL,H2}/(n_{PL,EG}+n_{PL,H2}) = Y_{PL,H2,\alpha}/(1+Y_{PL,H2,\alpha})$$

The optimal AG range for a given H$_2$ loading in the pipeline $Y_{H2;PI,\alpha}$ and the given pressure $p_1$ at the tapping point in the pipeline for the gas substream and a pressure drop $\Delta p$ that arises from the apparatus situation over the entire pathway of the gas substream and the established loading of the dry gas substream with water vapor $Y_{TG,H2O;\omega}$ results from the requirement that, within this range, the specific energy consumptions $ta_{var}$ must not be greater than 30% of the minimum specific energy consumption $ta_{var,min}$. The requirement of 30% corresponds to the typical approach that the competitor should have production costs at least 30% higher in the operation of an analogous process.

For example, with $p_1$=1.5 bar and $\Delta p$=0.1 bar and $Y_{TG,H2O;\omega}$=0.025. the following optimal AG ranges are found as a function of the H$_2$ loading in the pipeline $Y_{H2;PI,\alpha}$ $Y_{H2;PI,\alpha}$=0.05: $AG_{opt}$=0.57 to 0.99996; 0.64 to 0.9997; 0.73 to 0.997

$Y_{H2;PI,\alpha}$=0.10: $AG_{opt}$=0.48 to 0.9993; 0.55 to 997; 0.65 to 0.987

$Y_{H2;PI,\alpha}$=0.20: $AG_{opt}$=0.39 to 0.9958; 0.46 to 0.988; 0.55 to 0.965

For example, with $Y_{H2;PI,\alpha}$=0.10 and $p_1$=1.5 bar and $Y_{TG,H2O;\omega}$=0.025, the following optimal AG ranges are found as a function of the pressure drop $\Delta p$ over the entire pathway of the gas substream:

$\Delta p$=0.1 bar: $AG_{opt}$=0.48 to 0.9993; 0.55 to 0.997; 0.65 to 0.987

$\Delta p$=1.0 bar: $AG_{opt}$=0.56 to 0.99992; 0.63 to 0.9994; 0.73 to 0.996

$\Delta p$=10.0 bar: $AG_{opt}$=0.66 to 0.99999; 0.72 to 0.99998; 0.81 to 0.9997 For example, with $Y_{H2;PI,\alpha}$=0.1 and $p_1$=1.5 bar and $\Delta p$=0.1 bar, the following optimal AG ranges are found as a function of the H$_2$O loading of the gas substream $Y_{TG,H2O;\omega}$:

$Y_{TG,H2O;\omega}$=0.01: $AG_{opt}$=0.35 to 0.995; 0.41 to 0.986; 0.50 to 0.959

$Y_{TG,H2O;\omega}$=0.10: $AG_{opt}$=0.64 to 0.99999; 0.71 to 0.99998; 0.80 to 0.9995

$Y_{TG,H2O;\omega}$=0.20: $AG_{opt}$=0.69 to 0.99999; 0.76 to 0.99998; 0.84 to 0.99997

Step (v):

The retentate from the membrane unit (8), an H2-depleted stream, is recycled into the natural gas stream (1). If the water content of the retentate is too high for this recycling into the pipeline, the retentate is advantageously dried before being introduced into the pipeline. Drying processes (9) are known to the person skilled in the art; advantageous examples are gas scrubbings with ethylene glycols. Drying affords an aqueous stream (11) that can be worked up, for example, by distillation or with the aid of membrane methods. The water stream (11) obtained from the process of drying the retentate can advantageously be used for moistening of the gas substream (4) in step (iii).

Alternatively, the retentate from the membrane unit (8) is sent to a chemical utilization and/or used as fuel.

Many chemical processes and internal combustion engines can be operated solely with largely pure natural gas. The process for producing benzene from natural gas, for example, requires a separation of hydrogen from the reaction mixture to avoid establishment of a chemical equilibrium and stopping of the reaction. Here, the hydrogen concentration must be reduced from 11% to less than 1%. A further example is natural gas filling stations that supply cars and buses with natural gas, which may comprise only less than 2% hydrogen. Given an addition limit of 10% hydrogen as permitted nowadays, therefore, removal of the hydrogen is absolutely necessary. If appropriate, the retentate is cooled down before being introduced into the pipeline, advantageously from 100 to 260° C. in the membrane unit down to a dew point of −8° C. at pipeline pressure. Suitable apparatuses for cooling the gas substream are known to the person skilled in the art; advantageously, a gas-gas heat exchanger is used. Advantageously, such a gas-gas heat exchanger is used for simultaneous heating of the gas substream in step (iii) and for cooling the gas substream in step (v).

Method of Ascertaining the Optimal Partial Gas Volume Flow Rate

The invention further relates to a method of ascertaining the optimal gas substream which is drawn off from a pipeline that conducts natural gas and hydrogen in order to separate hydrogen from this gas substream in an electrochemical membrane unit. The optimal gas substream incurs the lowest separation costs.

Since only a mass flow rate (mass/h) is measurable, the optimal gas substream is determined as a mass flow rate. A molar flow rate (mol/h), by contrast, is of better suitability for the description of molar processes, for example the transport of H2 through the EHS or the moistening of gas streams. Conversion from moles to mass via the molar mass is common practice to the person skilled in the art.

Calculation of the optimal gas substream $m_{TG,opt}$ requires the optimal depletion level $AG_{opt}$. This is ascertained by iteration as follows: In the following formula for the H2 product-specific variable separation energy expenditure $ta_{var}$, the value for the depletion level AG is varied until the value for $ta_{var}$ is at its lowest.

$$ta_{var} = (1/AG) * \{K_{moist} * [(Y_{TG,H2O,\omega} - Y_{TG,H2O,\alpha})/Y_{PL,H2,\alpha}] + K_{comp} * (1+1/Y_{PL,H2,\alpha}) * \ln[(p1+\Delta p)/p1)]\} + K_F * \{U_{EHS,over} + K_{U,min} * \ln[1+(1+Y_{TG,H2O,\omega})/Y_{PL,H2,\alpha}/(1-AG)]\}$$

with the following constants:

$$K_{moist} = 13.78 \text{ kW}_{el}/\text{kg H2}, K_{comp} = 0.49 \text{ kW}_{el}/\text{kg},$$
$$KF = 26.59 \text{ Ah/kg H2}, K_{U,min} = 0.019V$$

and the process parameters:

$$U_{EHS,min} = K_{U,min} * \ln(p_{cathode}/(p_{anode} * Y_{TG,H2,\omega})),$$

$p_{cathode}$=pressure on cathode side, $p_{anode}$=pressure on anode side and $y_{TG,H2,\omega}$=molar proportion of H2 at the exit from the separation unit (8).

$\Delta p$ is the total pressure drop between the withdrawal station(15) and the refeeding station (16) for the gas substream from and to the pipeline.

$Y_{TG,H2O,\alpha}$ is the molar loading of the natural gas with H2O in the pipeline (1)

$Y_{TG,H2O,\omega}$ is the molar loading of the natural gas with H2O before entry to the separation unit $Y_{PL,H2,\alpha}$=molar loading of the natural gas with H2 in the pipeline (1)

The procedure for determination of the optimal depletion level $AG_{opt}$ may advantageously be as follows:

The procedure starts with an AG=0.90, which gives a value for the specific energy consumption $ta_{var}$.

Subsequently, the value for AG is increased by 0.01 to 0.91, and the corresponding specific energy consumption $ta_{var}$ is obtained. If the new value for $ta_{var}$ (AG=0.91) is less than the value before (AG=0.9), the new AG value is increased again by 0.01 in the next step. This procedure is repeated until the new value for $ta_{var}$ (AG$_{alt+0.01}$) is greater than the old (AG$_{alt}$). The old AG value then constitutes the optimal depletion level AG$_{var,opt}$.

If the AG value of 0.91 should lead to a higher value for $ta_{var}$ than the AG value of 0.90, in the next step, the value for AG is increased by 0.01 each time until the new value for $ta_{var}$ (AG$_{alt-0.01}$) rises again. The old AG value then constitutes the optimal depletion level AG$_{var,opt}$ with the minimum specific energy consumption $ta_{var,min}$.

Since the characteristic value per capital costs, expressed as $\Sigma(q_i+p_i)$, tends to follow the progression for $ta_{var}$, the value from the variation of AG is assumed to be the optimal value for $ta_{var}$.

The economic viability of a process is apparent from the difference between the price of a product and the product costs. The product costs can be calculated from the manufacturing costs and a return on investment (ROI), which reflects the return requirements, interest on capital and the tax situation. If the product costs are above the product price, the process is uneconomic. The production costs are composed of a variable component and a fixed component. In our case, the variable component is dominated by the energy costs. The energy costs here are the product of the cost of power and $ta_{var}$.

The fixed component, in a first approximation, is dependent on the capital costs. The capital costs are in turn calculated from the product of S(qi+pi) and the specific capital costs that relate thereto.

The ROI is directly proportional to the capital costs.

qi here is the total heat transfer output and pi is the total electrical power, based in each case on the H2 product mass flow rate mH2,Pr.

If the lowest value for $ta_{var}$ has been ascertained by variation/isolation of AG, the corresponding depletion level AG corresponds to the optimal depletion level AG$_{opt}$. With the aid of AG$_{opt}$, the optimal gas substream $m_{TG,var,\alpha,opt}$ is calculated by the formula:

$$m_{TG,var,\alpha,opt} = (M_{PL}/M_{H2}) * (1/AG_{var,opt}) * (1+1/Y_{PL,H2,\alpha}) * m_{H2,Pr}$$

with $M_{PL}$=molar mass of the hydrogen-natural gas mixture in the pipeline (1)

$M_{H2}$=molar mass of hydrogen=2.0159 g/mol $m_{H2,Pr}$=desired mass flow rate of pure hydrogen (6a)

Advantages:

The advantages of the present process are as follows: (i) one-stage process, (ii) efficient process, especially for low hydrogen concentrations, e.g. <5 bar, (iii) process tolerant to impurities in the feed gas stream, (iii) electrochemical separation in operation at ambient pressure, (iv) low space requirement, (v) modular principle: extension of capacity by installation of a further stack, (vi) advantageous for relatively small amounts of gas.

The advantage in the use of the method is that, for the wide variety of different hydrogen contents in the pipeline and for the wide variety of different pipeline pressures and for the wide variety of different electrochemical hydrogen separation technologies for a desired product stream, the optimal gas substream is not always at a depletion level of 1, but varies and can thus be ascertained. The optimal gas substream incurs the lowest separation costs.

FIG. 1 Shows the Process of the Invention for the Case that the Product is High-Purity H2.

A gas substream 2 is drawn off from a H2-containing natural gas stream 1 conveyed in a pipeline at a withdrawal point 15 without any change in the gas composition. This gas substream is compressed with a machine for increasing pressure 3 (e.g. fan or compressor) in order either to compensate solely for the pressure drops along the gas substream pathway or in order to build up the necessary pressure for separation of H2. This machine for increasing pressure may in principle be anywhere in the gas substream pathway. The person skilled in the art in the field of chemical engineering will know the best position.

Water 4 is added to the gas substream 2 for moistening of the gas substream 2. The water content needed is different according to the membrane technology It is also conceivable that the membrane is also supplied or solely supplied on the permeate side with water 4a to prevent it from drying out. In case of the EHS, the cathode space is the permeate side.

In the H2 separation unit 5, H2 is separated from the gas substream 2a. The membrane unit 5 is an electrochemical hydrogen separation, EHS. The driving force for the transport of H2 here is the natural logarithm of the electrical potential ratio.

The permeate is the hydrogen 6a. According to the technology, the permeate may still be too moist for the subsequent use. Then the stream 6a is advantageously subjected to a drying process 7, for example temperature swing adsorption. The stream 6 is then on-spec hydrogen. The retentate 8 in the case of an EHS is the anode off-stream.

If this H2-depleted stream is too moist for recycling into the pipeline at the refeeding point 16, it is advantageously subjected to drying 9 prior to introduction. Examples of useful drying processes include gas scrubbings with ethylene glycols. This affords an aqueous stream that can be worked up by distillation or with the aid of membrane methods. The water stream 11 obtained from the drying process could in principle be recirculated again to the moistening of the gas substream 2.

The dried low-H2 gas stream 10 is then fed back to the residual gas stream 12 in the pipeline grid.

In particular cases, it may be more favorable to dispense with the machine for increasing pressure 3 in the gas substream 2 and instead to install an apparatus for generating a pressure drop 14 (e.g. a throttle or a turbine) into the gas stream 12.

Figure 2:
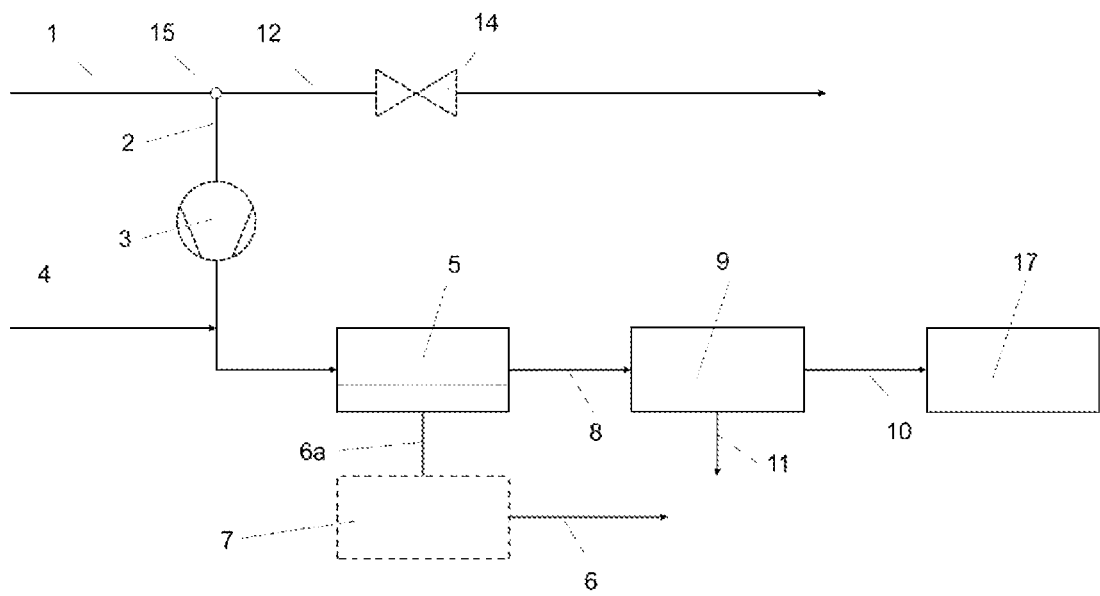
FIG. 2 shows the process according to the invention where the product is H2-free natural gas.

FIG. 2 Shows the Process of the Invention for the Case that the Product is H2-Free Natural Gas.

There are natural gas-consuming processes that require a specification with regard to the hydrogen content in the natural gas (FIG. 2). In this case, the gas substream 2 drawn off is likewise compressed (3) and moistened (4) if required before being fed to the membrane unit (5). Subsequently, the retentate stream (8) may still be dried (9) if required. The dried retentate stream (10) is then fed not into the pipeline but to the natural gas-consuming process (17).

Figure 3:
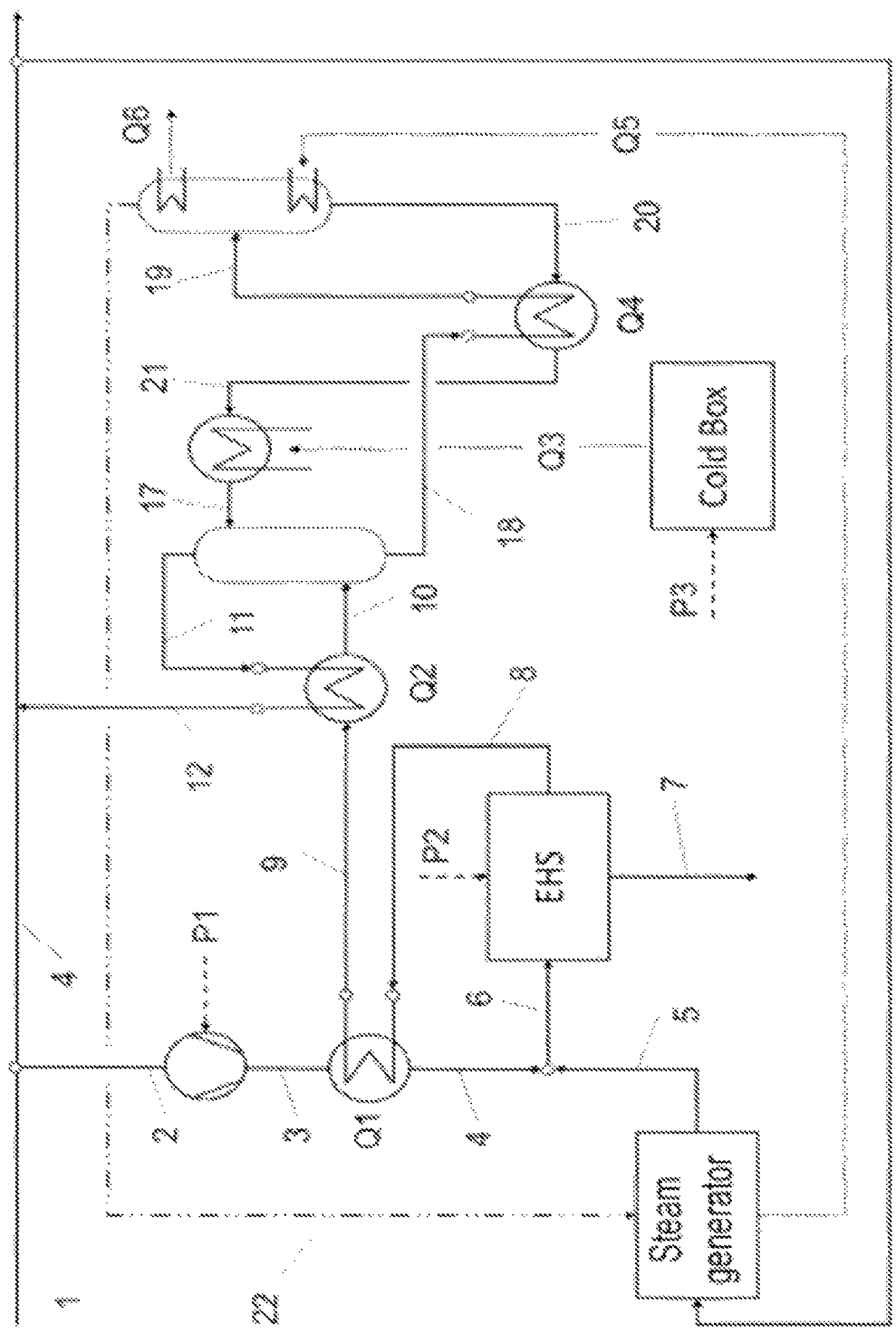
FIG. 3 shows the process according to the invention as exemplified.

FIG. 3 Shows the Process Example.

40 kg/h of H2 in ultrahigh purity (stream 7) are first to be separated from a pipeline in which 29 050 kg/h of natural gas (stream 1) is being conveyed at a positive pressure of 500 mbar, which initially comprises 10% by volume of H2. Upstream of the site of introduction of the H2 into the natural gas pipeline grid, the natural gas comprises 0.2% by volume of water. This corresponds to a dew point of −8° C. at 1.5 $bar_{absolute}$. The H2 is to be separated with the aid of an EHS which is operated at ambient pressure and at 160° C. and which requires a water content in gas stream 6 of 2.5% by volume upstream of the EHS for reliable operation thereof. In simplified terms, natural gas is to be considered as pure methane. In addition, the index PL hereinafter represents pipeline, the index α represents the start and the index ω represents the end. The indices H2, H2O and CH4 represent the respective component.

FIG. 3 shows the influence of the H2 loading of the natural gas in the pipeline YH2,PL, a on the specific energy consumption $ta_{var}$. The separation unit here moistens the gas substream to 0.025 mol H2O/mol of natural gas, and the total pressure drop over the gas substream pathway is 0.1 bar.

It is apparent that the optimal depletion level AG is in the range between 0.80 and 0.95. The optimal depletion level $AG_{opt}$ is where the specific energy consumption $ta_{var}$ has its lowest value. It is also apparent that the higher the H2 loading of the natural gas in the pipeline YH2,PI, α, the lower the optimal depletion level $AG_{opt}$. In the case that YH2,PI, α=0.05, $AG_{opt}$ is 0.95, and in the case that YH2, PI, α=0.20, $AG_{opt}$ is 0.80.

Figure 4:
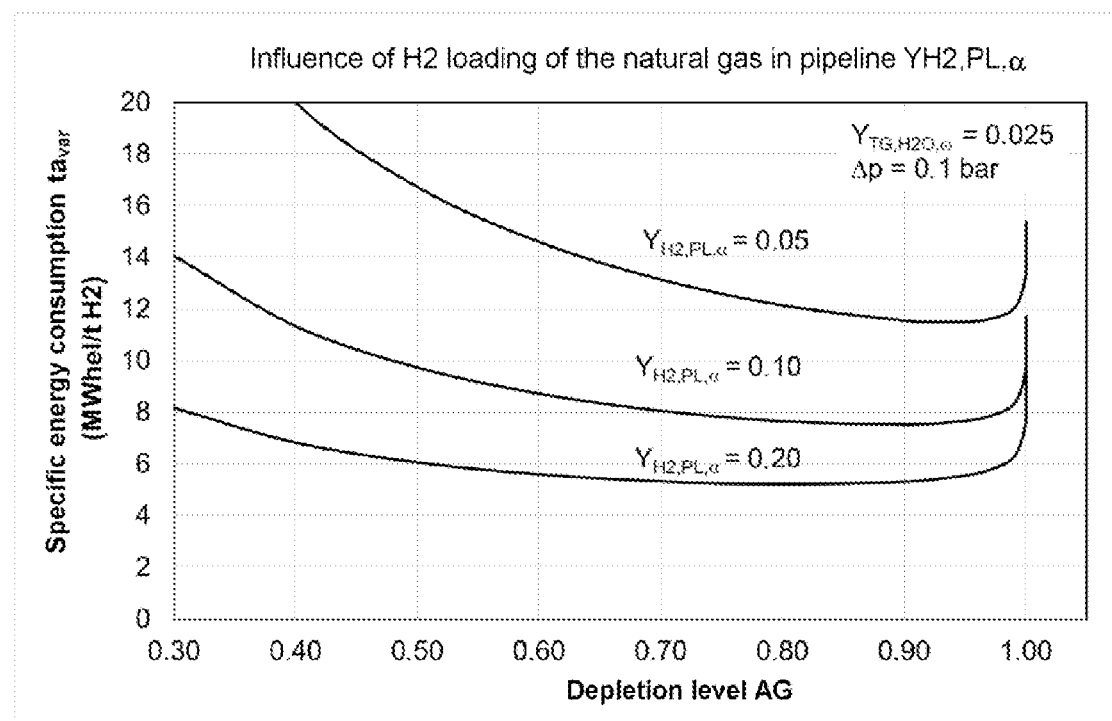
FIG. 4 is a graph showing the influence of the necessary moistening of the gas substream on the specific energy consumption $ta_{var}$.

FIG. 4 shows the influence of the necessary moistening of the gas substream on the specific energy consumption $ta_{var}$ for different H2O loadings of the natural gas YH2O;TG, ω in the gas substream upstream of the separation unit. The natural gas, in its original state, has an H2O loading of YTG,H2O, α=YPL,H2O, α=0.00223 mol of H2O/mol of natural gas. The H2 loading of the natural gas in the pipeline YH2,PL, a in this example is 0.10 mol H2/mol of natural gas, and the total pressure drop over the gas substream pathway is 0.1 bar.

It is apparent that the optimal depletion level AG is in the range between 0.70 and 0.97. It is also apparent that the lower the necessary moistening, the lower the optimal depletion level $AG_{opt}$. In the case that YTG,H2O, ω=0.010, $AG_{opt}$ is 0.70, and in the case that YTG,H2O, ω=0.200, $AG_{opt}$ is 0.97.

Figure 5:
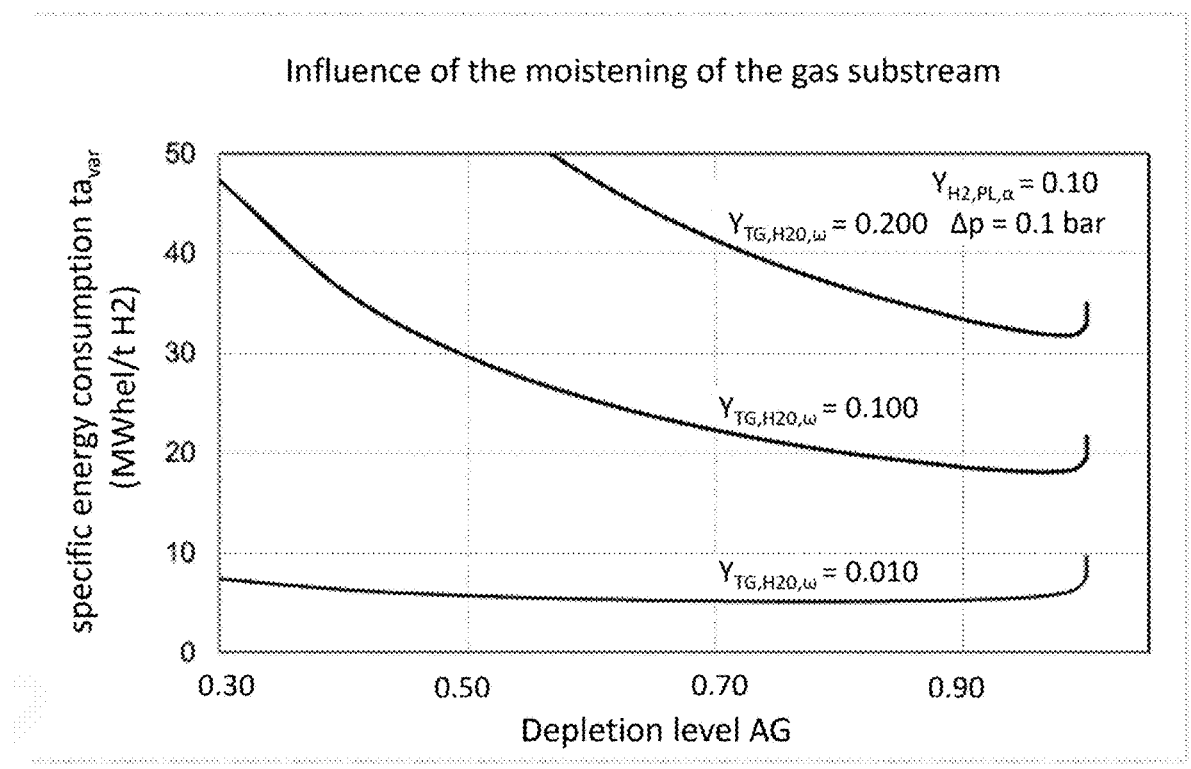
FIG. 5 is a graph showing the influence of the pressure drop over the entire pathway of the gas substream.

FIG. 5 shows the influence of the pressure drop over the entire pathway of the gas substream from the withdrawal station to the refeeding station into the pipeline on the specific energy consumption $ta_{var}$. The H2 loading of the natural gas in the pipeline YH2,PL, a in this example is 0.10 mol of H2/mol of natural gas, and the pipeline pressure p1 is 1.5 $bar_{abs}$. Upstream of the separation unit, the gas substream is moistened to 0.025 mol of H2O/mol of natural gas.

It is apparent that the optimal depletion level AG is in the range between 0.85 and 0.97. It is also apparent that the lower the pressure drop, the lower the optimal depletion level $AG_{opt}$. In the case that Δp=0.1 bar, $AG_{opt}$ is 0.85, and in the case that Δp=10.0 bar, $AG_{opt}$ is 0.97.

Figure 6:
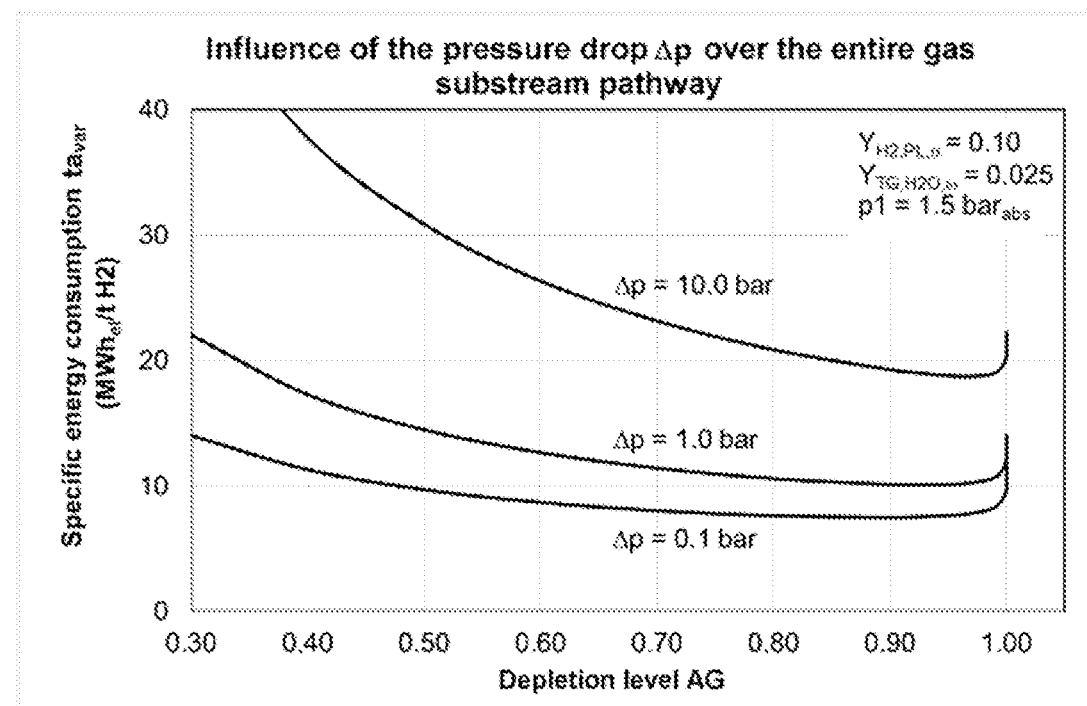
FIG. 6 is a graph showing the influence of the H2 loading of the natural gas in the pipeline YH2, PL, α.

FIG. 6 shows the influence of the H2 loading of the natural gas in the pipeline YH2,PL, a on the separation energy expenditure Σ(qi+pi). The capital costs for the overall plant are proportional to the separation energy expenditure.

The separation unit in this example moistens the gas substream to 0.025 mol H2O/mol of natural gas, and the total pressure drop over the gas substream pathway is 0.1 bar.

It is apparent that the optimal depletion level AG is in the range between 0.96 and 0.99. The optimal depletion level $AG_{opt}$ is where the separation energy expenditure Σ(qi+pi) has its lowest value. It is also apparent that the higher the H2 loading of the natural gas in the pipeline YH2,PI, α, the lower the optimal depletion level $AG_{opt}$. In the case that YH2,PI, α=0.05, $AG_{opt}$ is 0.99, and in the case that YH2,PI, α=0.20, $AG_{opt}$ is 0.96.

Figure 7:
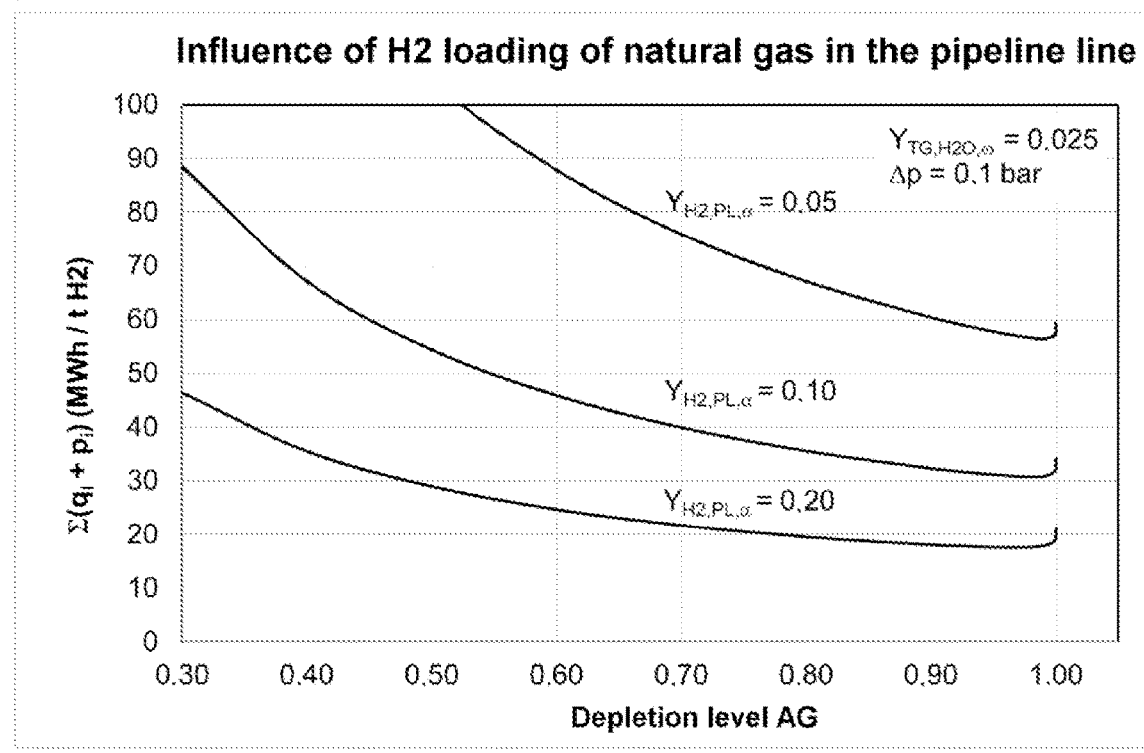
FIG. 7 is a graph showing the influence of the necessary moistening of the gas substream on the separation energy expenditure $\Sigma(qi+pi)$.

FIG. 7 shows the influence of the necessary moistening of the gas substream on the separation energy expenditure Σ(qi+pi) for different H2O loadings of the natural gas YH2O;TG, ω in the gas substream upstream of the separation unit. The natural gas, in its original state, has an H2O loading of YTG,H2O, α=YPL,H2O, α=0.00223 mol of H2O/mol of natural gas. The H2 loading of the natural gas in the pipeline YH2,PL, a in this example is 0.10 mol H2/mol of natural gas, and the total pressure drop over the gas substream pathway is 0.1 bar.

It is apparent that the optimal depletion level AG is in the range between 0.90 and 0.97. It is also apparent that the lower the necessary moistening, the greater the optimal depletion level $AG_{opt}$. In the case that YTG,H2O, $\omega$=0.010, $AG_{opt}$ is 0.97, and in the case that YTG,H2O, $\omega$=0.200, $AG_{opt}$ is 0.90.

Figure 8:
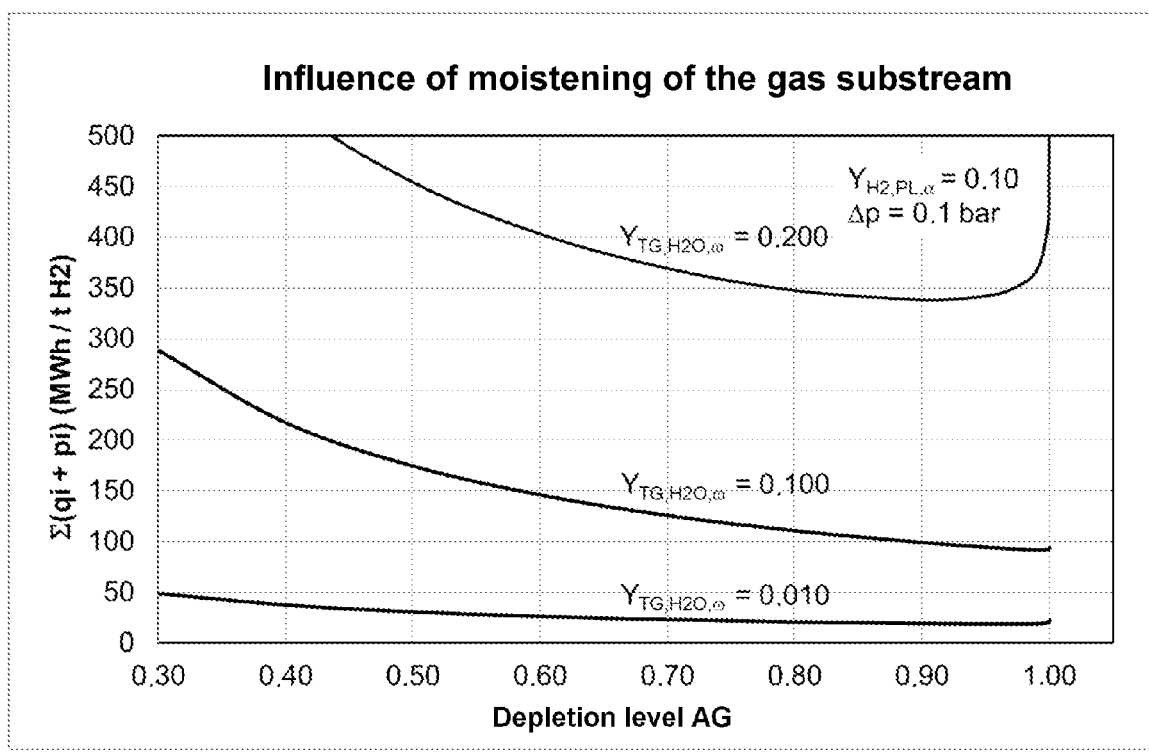
FIG. 8 is a graph showing the influence of the pressure drop over the entire pathway of the gas substream.
Figure 9:
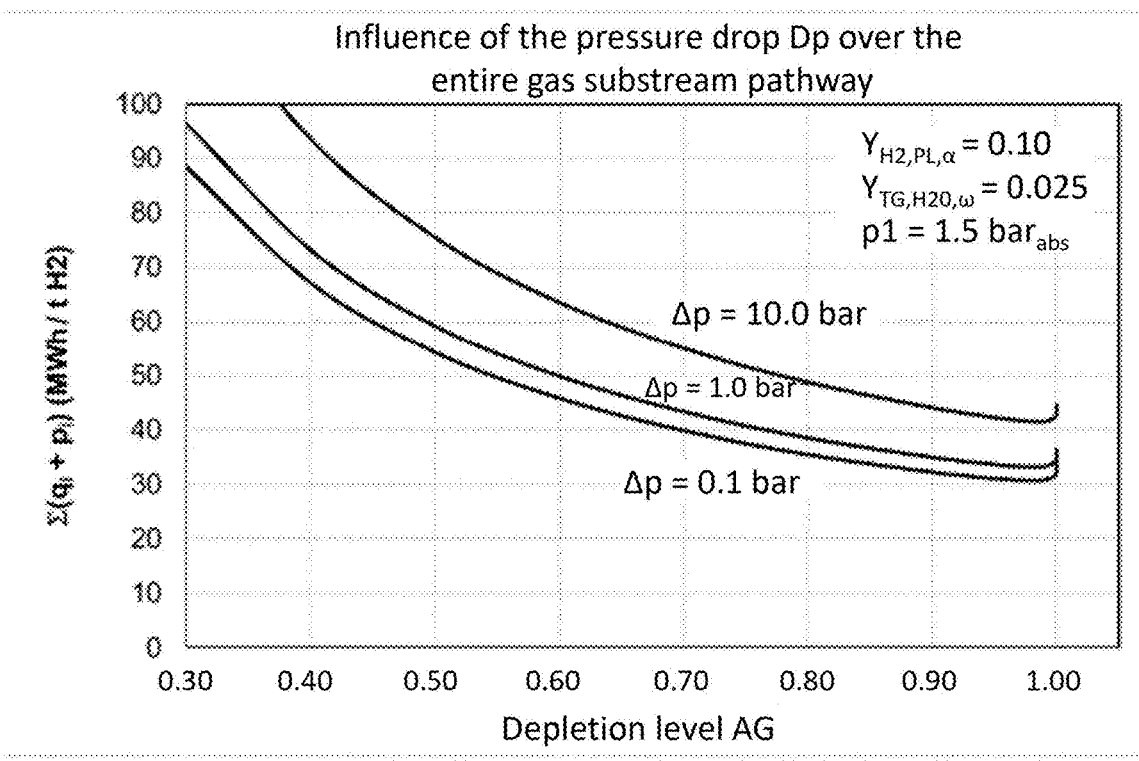
Fig. 9 is a graph showing the influence of the pressure drop Dp over the entire gas substream pathway.

FIG. 8 shows the influence of the pressure drop over the entire pathway of the gas substream from the withdrawal station 15 to the refeeding point 16 into the pipeline on the separation energy expenditure $\Sigma(qi+pi)$.

The H2 loading of the natural gas in the pipeline $Y_{H2,PL}$, $\alpha$ in this example is 0.10 mol of H2/mol of natural gas, and the pipeline pressure is 1.5 $bar_{abs}$. Upstream of the separation unit, the gas substream is moistened to 0.025 mol of H2O/mol of natural gas.

It is apparent that the optimal depletion level AG is in the range between 0.97 and 0.99. It is also apparent that the lower the pressure drop, the lower the optimal depletion level $AG_{opt}$. In the case that $\Delta p$=0.1 bar, $AG_{opt}$ is 0.97, and in the case that $\Delta p$=10.0 bar, $AG_{opt}$ is 0.99.

1) Pipeline

For a gas mixture stream 1 with 10% by volume of hydrogen in the pipeline, an average molar mass $M_{PL}$ of 14.64 kg/kmol is calculated. This leads to a value for the molar natural gas flow rate $n_{PL,\alpha}$:

$$n_{PL,\alpha}=m_{PL,\alpha}/M_{PL}=29050 \text{ kg/h}/14.64 \text{ kg/kmol}=1984.2 \text{ kmol/h} \quad (1.1)$$

The molar amount of H2 present in the gas mixture stream 1 upstream of the withdrawal point, $n_{PL,H2,\alpha}$, is $$n_{PL,H2,\alpha}=Y_{H2,\alpha}*n_{PL,\alpha}=1984.2*0.10=198.4 \text{ kmol/h} \quad (1.2)$$

The molar amount of H2O present in the gas mixture stream 1 upstream of the withdrawal point, $n_{PL,H2O,\alpha}$, is $$n_{PL,H2O,\alpha}=Y_{H2O,\alpha}*n_{PL,\alpha}=1984.2*0.002=3.97 \text{ kmol/h} \quad (1.3)$$

The molar amount of CH4 present in the gas mixture stream 1, $n_{PL,CH4,\alpha}$, is $$n_{PL,CH4,\alpha}=n_{PL,\alpha}-n_{PL,H2,\alpha}-n_{PL,H2O,\alpha}=1984.2-198.4-3.97=1781.83 \text{ kmol/h} \quad (1.4)$$

This leads to the following loadings Y based on the amount of CH4:

$$Y_{PL,H2,\alpha}=n_{PL,H2,\alpha}/n_{PL,CH4,\alpha}=198.4/1781.83=0.111 \quad (1.5)$$

$$Y_{PL,H2O,\alpha}=n_{PL,H2O,\alpha}/n_{PL,CH4,\alpha}=3.97/1781.83=0.00223 \quad (1.6)$$

The H2 product flow rate $n_{H2,Pr}$ desired for operation of a filling station is $$n_{H2,Pr}=m_{H2,Pr}/M_{H2}=40 \text{ kg/h}/2 \text{ kg/kmol}=20 \text{ kmol/h} \quad (1.7)$$

2) Gas Substream

The H2 is not separated directly from the gas mixture stream in the pipeline (1), but from a significantly smaller gas substream (2).

If a depletion level AG is defined as follows:

$$AG=(n_{TG,H2,\alpha}-n_{TG,H2,\omega})/n_{TG,H2,\alpha}=n_{H2,Pr}/n_{TG,H2,\alpha}=0.990 \quad (2.1)$$

with the amount of H2 present in gas substream 2 at the inlet to the EHS, $n_{TG,H2,\alpha}$, and the amount remaining in gas substream 8 at the exit from the EHS, $n_{TG,H2,\omega}$, this is directly correlated to the total partial gas volume present in gas substream 2 that has been drawn off from the pipeline stream, $n_{TG,\alpha}$:

$$n_{TG,\alpha}=(1/AG)*(1+1/Y_{PL,H2,\alpha})*n_{H2,Pr}=200 \text{ kmol/h} \quad (2.2)$$

All loadings hereinafter are based on the amount of CH or present in gas substream 2, since this remains constant over all process steps. This is because:

With the loading $$Y_{TG,H2,\alpha}=Y_{PL,H2,\alpha}=n_{TG,H2,\alpha}/n_{TG,CH4,\alpha} \quad (2.3)$$

and equation (2.1), it follows that $$n_{TG,CH4,\alpha}=n_{TG,CH4,\omega}=n_{TG,CH4}=n_{TG,H2,\alpha}/Y_{PL,H2,\alpha}=n_{H2,Pr}/AG/Y_{PL,H2,\alpha}=180 \text{ kmol/h} \quad (2.4)$$

with the ratio $$X=n_{H2,Pr}/n_{PL,H2,\alpha}=0.100 \quad (2.5)$$

3) Increase in Pressure

In order to overcome flow losses in the gas substream from 2 to 12, this must be compressed. In the ideal case, this is done isothermally. In this case, the compressor output P1 needed for this purpose in order to achieve an illustrative pressure increase of $\Delta p$=100 mbar is as follows:

$$P1=m_{TG,\alpha}*(R*T_{PL}/M_{PL}/\eta_{comp})*\ln((p_1+\Delta p)/p_1)=12 \text{ kW} \quad (3.1)$$

For the gas substream $m_{TG,\alpha}$, after some rearrangements, the following relationship is found:

$$m_{TG,\alpha}=m_{H2,Pr}*(K_{M,TG,\alpha}/AG)*(1+1/Y_{PL,H2,\alpha}=2934 \text{ kg/h} \quad (3.2)$$

with $$K_{M,TG,\alpha}=M_{TG,\alpha}/M_{H2}=M_{PL}/M_{H2}=7.26 \quad (3.3)$$

For the specific compressor output $p_{comp}$, it thus follows that:

$$p_{comp}=P1/m_{H2,Pr}=K_{comp}*(1/AG)*(1+1/Y_{PL,H2,\alpha})*\ln((p1+\Delta p)/p_1)=0.30 \text{ kW}_{el}/\text{kg H2} \quad (3.4)$$

with $$K_{comp}=R*T_{PL}/M_{H2}/\eta_{comp}=0.49 \text{ kW}_{el}/\text{kg H2} \quad (3.5)$$

And a derived compressor efficiency $\eta_{comp}$ of $$\eta_{comp}=0.70 \quad (3.6)$$

4) Heating/Cooling of Gas Substream

The isothermally compressed gas substream 3 has to be heated upstream of the EHS from the pipeline temperature $\tau_{PL}$=25° C. to that temperature of $\tau_{EHS}$=160° C. and then cooled down again. For this purpose, the heat flow Q1 has to be transferred in a heat exchanger.

With the approximate value for $cp_{TG}$ $$cp_{TG}=2.3 \text{ kJ/kg K} \quad (4.1)$$

it follows that $$Q1=m_{TG,\alpha}*cp_{TG}*(\tau_{EHS}-\tau_{PL})=253 \text{ kW} \quad (4.2)$$

The gas substream, before being introduced into the natural gas grid, has to be dried again to the water content of the natural gas pipeline of 0.2 mol %. In the case of drying with propylene glycol, for this purpose, according to a thermodynamic simulation for 1.5 $bar_{absolute}$, the gas substream has to be cooled down to $\tau_{drying}$=21° C. For this purpose, the heat flow Q2 has to be transferred in a heat exchanger.

$$Q2=m_{TG,\alpha}*cp_{TG}*(\tau_{PL}-\tau_{drying})=8 \text{ kW} \quad (4.3)$$

With $$K_{HT,TG}=cp_{TG}*((\tau_{EHS}-\tau_{drying})=0.089 \text{ kWh/kg} \quad (4.4)$$

it follows that, for the heat flow to be transferred based on the product mass flow rate $m_{H2,Pr}$, or the heat transfer output for the gas substream, $$q_{TG}=(Q1+Q2)/m_{H2,Pr}=K_{HT,TG}*(K_{M,TG}\alpha/AG)*(1+1/Y_{PL,H2}\cdot\alpha)=6.50 \text{ kWh/kg } H_2 \quad (4.5)$$

5) Separation of H2 with EHS

According to Faraday's law, for the electrochemical separation of stream 7 as H2 product volume flow rate $n_{H2,Pr}=19.84$ kmol/h, the following electrical current $I_{EHS}$ is needed:

$$I_{EHS}=2*n_{H2,Pr}*F=1\ 063\ 600 \text{ A} \quad (5.1)$$

with F=96485AS/mol (5.2)

The minimum voltage necessary for separation, $U_{EHS,min}$, is calculated by the following formula:

$$U_{EHS,min}=K_{U,min}*\ln(p_{cathode}/(p_{anode}*Y_{TG,H2},\omega))=0.127V \quad (5.3)$$

with $$K_{U,min}=R*T_{EHS}/2/F=0.019V \quad (5.4)$$

with the ideal gas constant R $$R=8.314 \text{ J/mol K} \quad (5.5)$$

and the partial H2 pressure in the cathode space $p_{H2,cathode}=1.013$ bar $$p_{H2,cathode}=p_{cathode}*y_{H2,cathode}=1.013 \text{bar} \quad (5.6)$$

with $y_{H2,cathode}=1$
and $$p_{anode}=1.013\text{bar} \quad (5.7)$$

For the necessary separation energy, the partial pressure at the exit from the EHS, $p_{H2,anode}$, is crucial, i.e.

$$p_{H2,anode}=p_{anode}*Y_{TG,H2}\omega=0.0011 \quad (5.8)$$

With equation (6.2) for $Y_{TG,H2O}\omega$, it follows that:

$$y_{TG,H2}\omega=1/(1+(1+Y_{TG,H2O}\omega)/Y_{PL,H2}\alpha/(1-AG))=0.0011 \quad (5.9)$$

In the EHS, however, conduction resistances $R_{EHS,specific}$ also occur across the membrane. These are dependent on the current density $i_{EHS}$ and the CO content of the gas mixture. The current density $i_{EHS}$ is normally in the order of magnitude of 0.1 to 1 A/cm$^2$.

For a CO-free gas mixture and an assumed current density $i_{EHS}$ of $$i_{EHS}=0.8 \text{ A/cm}^2 \quad (5.10)$$

the specific membrane resistance $R_{EHS,specific}$ is calculated for the CHS, for example, by the following formula:

$$R_{EHS,specific}=98-20*(i_{EHS}^2+i_{EHS})=69.2 M\Omega*cm^2 \quad (5.11)$$

The overvoltage component for the CHS, $U_{EHS,over}$ is thus calculated as follows:

$$U_{EHS,over}=R_{EHS,specific}*i_{EHS}=0.055V \quad (5.12)$$

This leads to the total voltage necessary for the separation of H2, $U_{EHS,tot}$:

$$U_{EHS,tot}=U_{EHS,min}+U_{EHS,over}=0.182V \quad (5.13)$$

The necessary electrical power P2 for the EHS is then found from $$P2=U_{EHS,tot}*I_{EHS}=194 \text{ kW} \quad (5.14)$$

or the electrical power $p_{EHS}$ based on the H2 product mass flow rate $$p_{EHS}=P_{EHS}/m_{H2,Pr}=4.84 \text{ kWh/kg } H_2 \quad (5.15)$$

6) Moistening/Drying

The water content $y_{TG,H2O},\omega$ in gas substream 6 upstream of the EHS should, by way of example, be 2.5% by volume in order to prevent the membrane from drying out. In order to attain that value, a water vapor stream $\Delta n_{TG,H2O}$ is added via stream 5 to the partial gas volume flow 6.

With equation (1.6) and $$Y_{TG,H2O},\alpha=Y_{pL,H2O},\alpha=0.00223 \quad (6.1)$$

and $$Y_{TG,H2O},\omega=(1+Y_{PL,H2},\alpha(1/y_{TG,H2O},\omega-1)=0.0285 \quad (6.2)$$

it follows with equation (2.4) that $$\Delta n_{TG,H2O}=n_{TG,CH4}*(Y_{TG,H2O},\omega-Y_{TG,H2O},\alpha)=4.73 \text{ kmol H2O/h} \quad (6.3)$$

or $$\Delta m_{TG,H2O}=\Delta n_{TG,H2O}*M_{,H2O}=85.1 \text{ kg H2O/h} \quad (6.4)$$

This additionally introduced amount of water vapor $\Delta m_{TG,H2O}$, downstream of the EHS, must be separated again from gas substream 8 in order to prevent condensation after the H2-depleted gas substream 12 has been fed back to the pipeline.

According to the prior art, the gas substream 9 is dried with the aid of a glycol scrub. This requires both steam and power for operation. The steam is generated here by way of example by combustion of natural gas.

A thermodynamic simulation conducted by way of example gives the specific consumptions that follow, which take account both of the moistening of the gas substream with water and of the drying of the retentate or of the anode offgas downstream of the EHS with the aid of a propylene glycol scrub.

For the generation of the steam, for every kg of water vapor volume introduced, $$K_{cal,H2O}=2.29 \text{ kWh}_{CH4}/\text{kg H2O} \quad (6.4)$$

of thermal energy is required. If this is provided by CH4 combustion, it is necessary for this purpose to burn, for every kg of water vapor volume introduced, $$K_{CH4,H2O}=0.165 \text{ kg CH4/kg H2O} \quad (6.5).$$

This is used to calculate the hourly natural gas consumption for the moistening:

$$m_{CH4,H2O}=K_{CH4,H2O}*m_{TG,H2O}=14.0 \text{ kg CH4/h} \quad (6.6)$$

which is supplied to the steam generator via stream 22.

For the operation of the glycol scrub, $$K_{el,H2O}=0.97 \text{ kWh}_{el}/\text{kg H2O} \quad (6.7)$$

of electrical energy is required for the refrigeration in the cold box. This is used to calculate the electrical power consumption for the moistening P3:

$$P3=K_{el,H2O}*m_{TG,H2O}=82 \text{ kW}_{el} \quad (6.8)$$

In total, for the moistening and drying of the gas substream, it is necessary to transfer $$K_{HT,H2O}=7.99 \text{ kWh/kg H2O} \quad (6.9)$$

of heat. This is used to calculate the total heat transfer output $Q_{HT,H2O}$ $$Q_{HT,H2O}=Q3+Q4+Q5+Q6=K_{HT,H2O}*m_{TG,H2O}=681 \text{ kW} \quad (6.10)$$

With $$K_{H2O}=(M_{H2O}/M_{H2})*[(Y_{TG,H2O,\omega}-Y_{TG,H2O,\alpha})/Y_{PL,H2,\alpha}]*(1/AG)=2.13 \quad (6.11)$$

the specific consumption values based on the amount of product $m_{H2,Pr}$ are then found for natural gas demand:

$$h_{H2O}=m_{CH4,H2O}/m_{H2,Pr}=K_{cal,H2O}*K_{H2O}=4.87 \text{ kg CH4/kg H2} \quad (6.12)$$

for the power demand:

$$p_{H2O}=P3/m_{H2,Pr}=K_{el,H2O}*K_{H2O}=2.06 \text{ kW}_{el}/\text{kg H2} \quad (6.13)$$

and for the heat transfer output:

$$q_{H2O}=Q_{HT,H2O}/m_{H2,Pr}=K_{HT,H2O}*K_{H2O}=17.0 \text{ kW}_{therm}/\text{kg H2} \quad (6.14)$$

7) Separation Energy Expenditure

The total separation energy expenditure $TA_{tot}$ is composed of a variable component $TA_{var}$ and a fixed component $TA_{fix}$ $$TA_{tot}=TA_{var}+TA_{fix} \quad (7.1)$$

The variable component based on the H2 product volume flow rate includes all the essential operating media $$ta_{var}=TA_{var}/m_{H2,Pr}=h_{H2O}*(1/F_{el,Gas})+p_{comp}+p_{EHS}+p_{H2O} \quad (7.2)$$

with the power-gas factor $F_{el,Gas}$ which describes the ratio of power price to natural gas price and for which, by way of example, the value $$F_{el,Gas}=4.0 \text{ kW}_{el}/\text{kW}_{cal} \quad (7.3)$$

It follows from this that $$ta_{var}=4.29/4.0+0.44+4.84+2.19=8.50 \text{ kW}_{el}/\text{kg H2O} \quad (7.4)$$

The general formula for the ascertaining of the H2 product-specific variable separation energy expenditure is thus:

$$ta_{var}=(1/AG)*[K_{moist}*[(Y_{TG,H2O,\omega}-Y_{TG,H2O,\alpha})/Y_{PL,H2,\alpha}]+K_{comp}*(1+1/Y_{PL,H2,\alpha})*\ln(p1+\Delta p)/p1)]+K_F*\{U_{EHS,over}+K_{U,min}*\ln[1+(1+Y_{TG,H2O,\omega})/Y_{PL,H2,\alpha}/(1-AG)]\} \quad (7.5)$$

with $$K_F=2*F/M_{H2}/3600=26.59 \text{ Ah/kg H2} \quad (7.6)$$

and $$K_{moist}=(M_{H2O}/M_{H2})*(K_{cal,H2O}/F_{el,Gas}+K_{el,H2O})=13.78 \text{ kW}_{el/kg}\text{H2} \quad (7.7)$$

and $$p1=\text{pressure upstream of compressor} \quad (7.8)$$

The variation of AG, with equation (2.2), for each of the parameters gives an optimal gas subvolume $m_{TG}$, $\alpha_{op}$ at which the H2 product-specific variable separation energy expenditure is at a minimum:

$$m_{TG,var,\alpha_{opt}}=(M_{PL}/M_{H2})*(1/AG_{var,opt})*(1+1/Y_{PL,H2,\alpha})*m_{H2,Pr} \quad (7.9)$$

FIGS. 3, 4 and 5 show, by way of example, the dependence of the H2 product-specific variable separation energy expenditure on the depletion level AG. The optimal separation level is always in the range between $0.80<AG_{var,opt}<0.99$.

The fixed component of the necessary separation energy expenditure, based on the H2 product volume flow rate, derives from the capital costs. The capital costs are proportional to the power for the raising of the pressure $p_{comp}$, the heat transfer output for the heating or cooling of the gas substream $q_{TG}$, the power for the moistening and drying of the gas substream $p_{H2O}$ and $q_{H2O}$, and for the separation performance of the EHS $p_{EHS}$.

Specific capital expenditure costs $I_{spec}$ are proportional to the sum total of all expenditures $\Sigma(p_i+q_i)$.

$$\Sigma(p_i+q_i)=p_{comp}+q_{TG}+p_{H2O}+q_{H2O}+p_{EHS}$$

FIGS. 6 to 8 show that there is also minimum for the sum $\Sigma(p_i+q_i)$ that is of relevance in respect of capital costs. In other words, there also exists an optimal gas substream. The optimal separation level here is always in the range between $0.90<AG_{fix,opt}<0.99$.

$$m_{TG,fix,\alpha_{opt}}=(M_{PL}/M_{H2})*(1/AG_{fix,opt})*(1+1/Y_{PL,H2,\alpha})*m_{H2,Pr}$$

Figure 10:
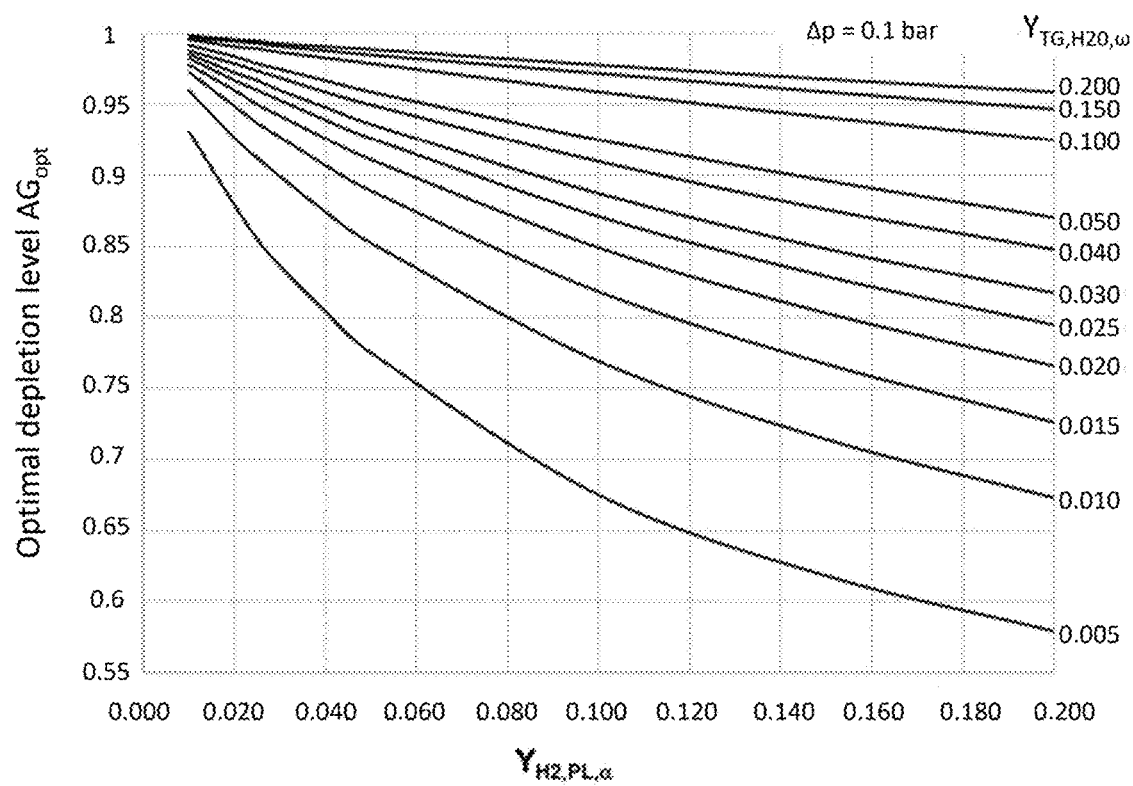
Fig. 10 is a graph showing the complex dependence of the optimal total depletion level $AG_{opt}$.

The complex dependence of the optimal total depletion level $AG_{opt}$—which takes account both of the variable and of the fixed component—on the two main influencing parameters of $H_2$ loading of the natural gas stream in the pipeline $Y_{PL,H2,\alpha}$ and steam loading of the gas substream before entry into the separation unit $Y_{TG;H2O,\omega}$, for the case that a pressure drop $\Delta p$ of 0.1 bar occurs over the entire pathway of the gas portion from the withdrawal station 15 to the refeeding station 16, is listed in table 1 for some sampling points and is shown in FIG. 10.

TABLE 1

$AG_{opt}$ as a function of $Y_{H2,PL,\alpha}$ and $Y_{TG,H2O,\omega}$ with $\Delta p = 0.1$ bar

| $Y_{H2,PL,\alpha}$ | $Y_{TG,H2O,\omega}$ | | | | | | | | | |
|---|---|---|---|---|---|---|---|---|---|---|
| | 0.005 | 0.010 | 0.020 | 0.025 | 0.030 | 0.040 | 0.050 | 0.100 | 0.150 | 0.200 |
| 0.010 | 0.931 | 0.960 | 0.975 | 0.983 | 0.985 | 0.988 | 0.992 | 0.996 | 0.997 | 0.999 |
| 0.020 | 0.879 | 0.926 | 0.960 | 0.967 | 0.972 | 0.979 | 0.984 | 0.991 | 0.994 | 0.995 |
| 0.025 | 0.855 | 0.912 | 0.950 | 0.960 | 0.967 | 0.974 | 0.979 | 0.990 | 0.993 | 0.995 |
| 0.030 | 0.836 | 0.899 | 0.942 | 0.953 | 0.960 | 0.969 | 0.975 | 0.987 | 0.991 | 0.993 |
| 0.040 | 0.804 | 0.874 | 0.926 | 0.939 | 0.948 | 0.959 | 0.967 | 0.983 | 0.988 | 0.991 |
| 0.050 | 0.775 | 0.852 | 0.911 | 0.926 | 0.936 | 0.950 | 0.959 | 0.979 | 0.985 | 0.989 |
| 0.100 | 0.675 | 0.769 | 0.849 | 0.871 | 0.887 | 0.910 | 0.925 | 0.959 | 0.972 | 0.978 |
| 0.150 | 0.618 | 0.714 | 0.803 | 0.829 | 0.848 | 0.876 | 0.896 | 0.941 | 0.959 | 0.968 |
| 0.200 | 0.579 | 0.673 | 0.766 | 0.795 | 0.817 | 0.848 | 0.870 | 0.925 | 0.947 | 0.959 |

The invention claimed is:

1. A one-stage membrane process for electrochemical separation of hydrogen from natural gas streams in a membrane unit, having the following process steps:
   (i) drawing a gas substream off from a natural gas stream in a pipeline having a positive pressure in the range from 50 mbar to 100 bar without any change in the gas composition, where the mass flow rate of the gas substream is adjusted depending on the hydrogen content in the natural gas stream such that a depletion level of 0.65 to 0.975 is established in the case of a hydrogen concentration of <10% by volume and a depletion level of 0.55 to 0.925 in the case of a hydrogen concentration of >10% by weight, where the depletion level is defined as the quotient of the desired molar H2 product stream and the molar H2 reactant flow rate in the gas substream at the inlet of the membrane unit,
   (ii) compressing the gas substream upstream of the membrane unit,
   (iii) heating the gas substream to 100 to 250° C. either upstream of the membrane unit or in the membrane unit, and this gas substream is supplied with water, with supply of water to the gas substream either upstream of the membrane unit and/or to the permeate side of the membrane unit, such that the water loading is between 0.005 and 0.2 mol of water/mol of natural gas,
   (iv) supplying the gas substream to the electrochemical membrane unit and hydrogen is separated off as permeate at a temperature of 100 to 250° C.,
   (v) recycling the retentate from the membrane unit into the natural gas stream in the pipeline, sent to a chemical utilization and/or used as fuel.

2. The process according to claim 1, wherein the pipeline has a positive pressure of 100 mbar to 10 bar.

3. The process according to claim 1, wherein the pipeline has a positive pressure of 100 mbar to 2 bar.

4. The process according to claim 1, wherein the hydrogen content of the natural gas streams in the pipeline is 0.1% to 20% by volume.

5. The process according to claim 1, wherein the hydrogen content of the natural gas streams in the pipeline is 0.5% to 5% by volume.

6. The process according to claim 1, wherein a polybenzimidazole membrane based on polybenzimidazole and phosphoric acid is used in the membrane unit.

7. The process according to claim 1, wherein the electrochemical separation process in the membrane unit is conducted at a temperature of 120 to 200° C.

8. The process according to claim 1, wherein the water loading in step (iii) is 0.015 to 0.035 mol of H2O/mol of natural gas.

9. The process according to claim 1, wherein a gas-gas heat exchanger simultaneously heats up the gas substream and cools down the retentate.

10. The process according to claim 1, wherein the retentate is dried in a drying stage.

11. The process according to claim 10, wherein the hydrogen stream obtained from the process of drying the retentate is used for moistening the gas substream in step (iii).

12. The process according to claim 1, wherein the depletion level of a gas substream is ascertained with the aid of the following formulae $$m_{TG,var,a,opt} = (M_{PL}/M_{H2}) \ast (1/AG_{var,opt}) \ast (1+1/Y_{PL,H2,\alpha}) \ast m_{H2,Pr}$$

where:
$M_{PL}$=molar mass of the hydrogen-natural gas mixture in the pipeline,
$M_{H2}$=molar mass of hydrogen=2.0159 g/mol,
$AG_{var,opt}$=optimal depletion level of the molar amount of hydrogen in gas substream, calculated by the method that follows,
$Y_{PL,H2,\alpha}$=molar proportion of hydrogen in the hydrogen-natural gas mixture in the pipeline,
$m_{H2,Pr}$=desired mass flow rate of pure hydrogen,
where:
in the following formula for the H2 product-specific variable separation energy expenditure $ta_{var}$, the value for the depletion level AG is varied by iteration until the value for $ta_{var}$ is at its lowest:

$$ta_{var} = (1/AG) \ast [K_{moist} \ast [(Y_{TG,H2O,\omega} - Y_{TG,H2O,\alpha})/Y_{PL,H2,\alpha}] + K_{comp} \ast (1+1/Y_{PL,H2,\alpha}) \ast \ln[(p1+\Delta p)/p1)]] + K_F \ast \{U_{EHS,over} + K_{U,min} \ast \ln[1+(1+Y_{TG,H2O,\omega}/Y_{PL,H2,\alpha}/(1-AG)]\}$$

with the following constants:
$K_{moist}$=13.78 kW$_{el}$/kg H2,
$K_{comp}$=0.49 kW$_{el}$/kg,
$K_{U,min}$=0.019 V,
and the process parameters:
P1=pipeline pressure,
$\Delta p$=the total pressure drop between the withdrawal station and the refeeding station for the gas substream from and to the pipeline,
$U_{EHS,over} = R_{EHS,specific} \ast i_{EHS}$=0.055V with conduction resistances $R_{EHS,specific}$ and current density $i_{EHS}$,
$p_{anode}$=pressure on anode side, and
$y_{TG,H2,\omega}$=molar proportion of H2 at the exit from the separation unit,
$Y_{TG,H2O,\alpha}$=molar loading of the natural gas with H2O in the pipeline, and
$Y_{TG,H2O,\omega}$=molar loading of the natural gas with H2O before entry to the separation unit.

* * * * *